(12) United States Patent
Woodard, Jr.

(10) Patent No.: US 12,159,364 B2
(45) Date of Patent: Dec. 3, 2024

(54) USER-INTERACTIVITY ENABLED SEARCH FILTER TOOL OPTIMIZED FOR VIRTUALIZED WORLDS

(71) Applicant: Kenneth La-Verne Woodard, Jr., Chicago, IL (US)

(72) Inventor: Kenneth La-Verne Woodard, Jr., Chicago, IL (US)

( * ) Notice: Subject to any disclaimer, the term of this patent is extended or adjusted under 35 U.S.C. 154(b) by 0 days.

(21) Appl. No.: 18/591,743

(22) Filed: Feb. 29, 2024

(65) Prior Publication Data

US 2024/0296643 A1 Sep. 5, 2024

Related U.S. Application Data

(60) Provisional application No. 63/576,444, filed on Mar. 1, 2023.

(51) Int. Cl.
*G06T 19/20* (2011.01)
*G06T 7/70* (2017.01)
*G06T 19/00* (2011.01)

(52) U.S. Cl.
CPC ........... *G06T 19/20* (2013.01); *G06T 7/70* (2017.01); *G06T 19/003* (2013.01); *G06T 2219/2004* (2013.01)

(58) Field of Classification Search
CPC .............................. G06T 19/003; G06T 19/20
See application file for complete search history.

(56) References Cited

U.S. PATENT DOCUMENTS

| | | | |
|---|---|---|---|
| 6,356,899 B1 | 3/2002 | Chakrabati et al. | |
| 7,231,405 B2 | 6/2007 | Xia | |
| 8,055,656 B2 | 11/2011 | Cradick et al. | |
| 8,131,740 B2 | 3/2012 | Cradick et al. | |
| 9,311,742 B1* | 4/2016 | Glover | G06T 15/08 |
| 11,302,082 B2 | 4/2022 | Martin | |
| 2007/0024613 A1 | 2/2007 | Jung et al. | |
| 2014/0245232 A1* | 8/2014 | Bailiang | G06T 17/05 |
| | | | 715/850 |
| 2023/0117482 A1* | 4/2023 | D'Angelo | G06T 13/40 |
| | | | 345/419 |
| 2024/0029361 A1* | 1/2024 | Tam | G06Q 30/0641 |

* cited by examiner

*Primary Examiner* — Charles Tseng
(74) *Attorney, Agent, or Firm* — Perkins Coie LLP

(57) ABSTRACT

Systems, methods, and/or computer readable media for generating representations of searchable experiences in a virtual environment are disclosed. The virtual environment comprising a sector having one or more virtual structures is generated. A position of an avatar in the virtual environment is detected, and based on the detection, a sector data layer comprising data items related to a predetermined dataset is generated. The data items are associated with the sector, and an attribute of the sector is configured and displayed to the user. A second position of the avatar in the virtual environment is detected, and based on the detection, a subset of data using the set of items in the sector data layer is generated. An attribute of the virtual structure within the sector is configured and displayed to the user.

20 Claims, 13 Drawing Sheets

USER-INTERACTIVITY ENABLED SEARCH FILTER TOOL OPTIMIZED FOR VIRTUALIZED WORLDS

FIELD

This application relates generally to systems, methods, and computer-readable media, such as systems, methods, and computer-readable media used in the field of educational technology for generating searchable simulations of career experiences in virtual reality (VR).

BACKGROUND

Virtual reality (VR) employs pose tracking and three-dimensional (3D) near-eye displays to give the user (also sometimes referred to as player, participant, and so forth) an immersive feel of a virtual world. Various types of VR-style technology include augmented reality and mixed reality. Virtual reality systems can use virtual reality headsets or multi-projected environments to generate realistic images, sounds and other sensations that simulate a user's physical presence in a virtual environment.

BRIEF DESCRIPTION OF THE DRAWINGS

Detailed descriptions of implementations of the present invention will be described and explained through the use of the accompanying drawings.

Figure 1:
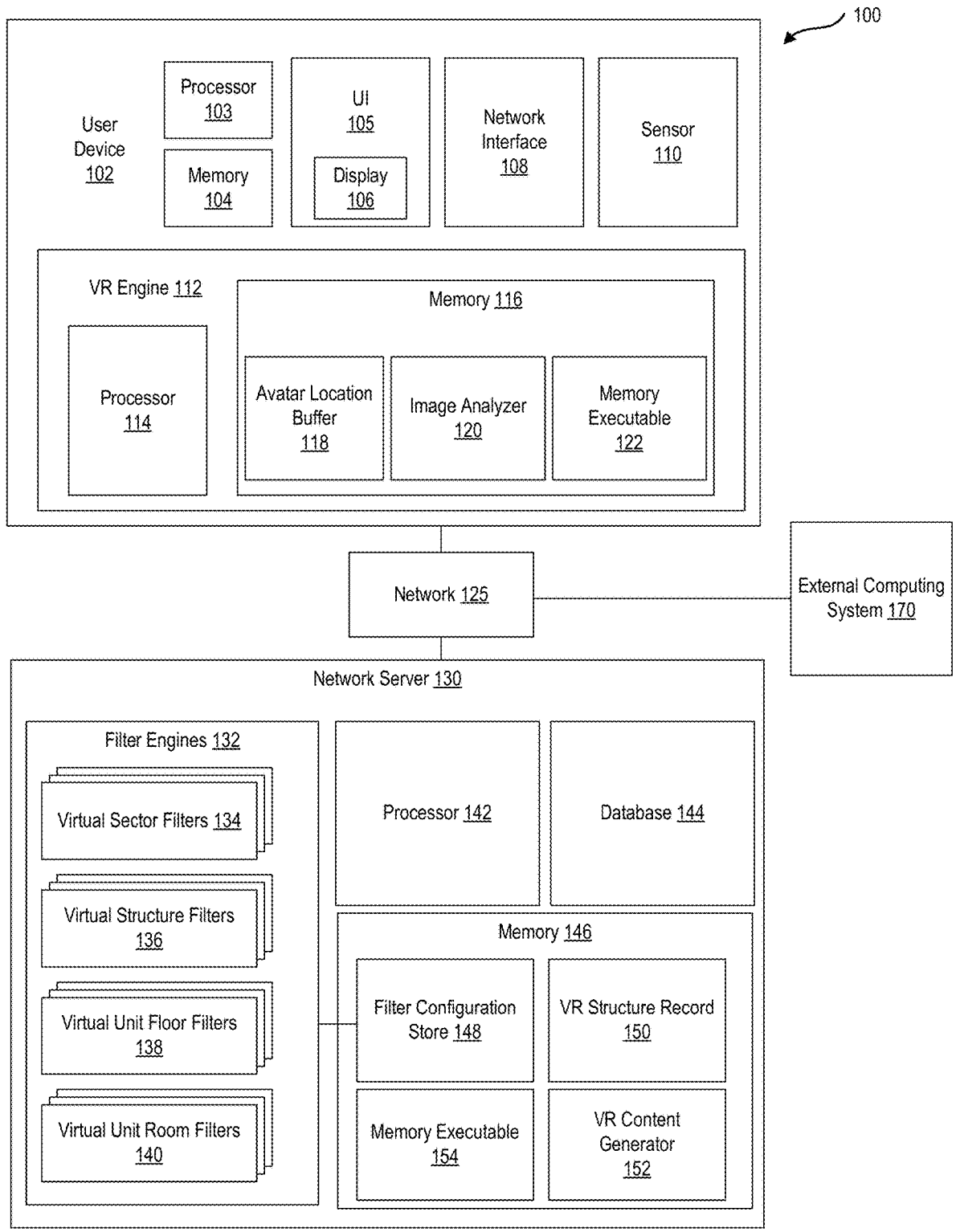
FIG. 1 is a block diagram illustrating an example system 100 for providing a virtual reality (VR) content for a VR experience.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the disclosure. Accordingly, while specific implementations are shown in the drawings, the technology is amenable to various modifications.

DETAILED DESCRIPTION

Students choose careers based on a variety of factors, including interests, skills, and values. The process often involves self-exploration, research on different professions, internships, and volunteer work to gain experience in different fields. Career counseling and advice from mentors or professionals in the field can also play a role. In situations where individuals do not have access to professional career counseling resources, the process of researching career options can be complicated and time-consuming. Opportunities can be missed because individuals may not be aware of available resources, or the resources can be fragmented. An individual can miss a viable career path by simply not considering a particular category of options—either because the options are assumed to be non-feasible (and data that would indicate otherwise is not considered) or because the individual does not receive the necessary counseling.

The disclosed technologies relate to systems, methods, and/or computer-readable media for generating an interactive virtual environment experience, where users accessing the virtual environment are enabled to obtain information in areas of interest by controlling avatars to interact with virtual structures within the virtual environment. For instance, the technology enables individuals to access and navigate searchable, simulated college- and career-related experiences, such as educational programs, educational majors, internships, and/or jobs. The relevant experiences are automatically identified, simulated and served without requiring individuals to query or otherwise search for them. Accordingly, the disclosed technologies enable individuals to immerse in simulated career experiences without having to enter search strings or otherwise expressly specify search terms.

Unlike objects, which can be straightforward to search for and simulate (for example, by rendering physical object characteristics to create visual approximations of objects), the richness, length, and various features of experiences make them comparatively more difficult to simulate in a fashion that captures their key attributes in a user-specific manner. To overcome this problem, in some implementations, the virtual structures within the virtual environment can represent layers of progressively disclosed information, and the information may be periodically updated and/or catered based on automatic actions (e.g., AI-based information augmentation) taken in response to detected avatar activity. In some implementations, the virtual structures presented to users can include surveys or forms, enabling users to complete surveys or forms by interacting with the virtual structure and other assets of various levels within the virtual environment. According to various implementations, the virtual structures can include sets of objects, which can be hierarchical, linked, and so forth.

Certain aspects of virtual structures can be generated and/or configured in response to user activity in a particular virtual environment, which enables the platform to identify and serve relevant information merely based on cues, without requiring the user to go through a cumbersome process of supplying search criteria for queries. For instance, a platform can initially present a set of virtual structures associated with several career options, and present supplemental or related information for a particular career option if the platform detects that the participant's relatively stronger interest in the option (e.g., by comparing durations of time the options are in the field of view, by determining that an avatar positions itself closer to a particular option relative to other options, and so forth). This approach has a further advantage of enabling the environment to present items that may be of interest but that the user may not expressly search for. For example, if a particular individual is interested in game development, the platform can present generalized variants and options (e.g., computer science), related variants and options (e.g., filmmaking), and/or complementary variants and options (e.g., advanced degree options, such as MBA, technology law, privacy law, and so forth). Accordingly, in some implementations, the techniques include using simulations and/or filters associated with layers of information to identify and display relevant information to the user, based on detecting user activity.

In some implementations, in order to enhance user experience and more accurately present information pertaining to areas of interest indicated by a user, an AI engine may be included. The AI engine can generate some or all of the information in response to inputs received from the user and/or detected user/avatar activity. For example, a virtual structure within the virtual environment may be associated with a generative AI executable, which can include or reference one or more trained models. The generative AI executable can create and/or execute a prompt upon receiving input indicating user interaction with the virtual structure. The AI engine may subsequently generate a response to the prompt including a description of the associated virtual structure and display the description as textual, visual, and/or audio output.

The generative AI executable can include one or more trained models, which can use optimized (e.g., transformed, modified, fused, aggregated) training data that enables the model to make inferences not apparent from non-enhanced source data. For example, as described further herein, separate datasets, such as job datasets and skill datasets, can be associated to create labels. The skill labels associated with job records, or job labels associated with skill records, can enable training of the AI model to generate inferences regarding transferability of job skills when the model is applied to only one of a subsequent dataset (e.g., jobs or skills, but not both). Accordingly, the outputs returned by the AI executable can not only be used to populate the virtual environment in response to targeted, context-sensitive prompts (as described further herein), but also to provide high-quality AI-generated outputs even if the data on which the AI model is run at the time of execution of the AI executable represents only a subset of training data (for example, if the AI model operates on jobs data or skills data, but not both, but the AI model has been trained to infer skill-related attributes from jobs data or job-related attributes from skill data).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Generating VR Content

FIG. 1 is a block diagram illustrating an example system 100 for providing a virtual reality (VR) content for a VR experience. The example system 100 can facilitate computer-based operations for generating representations of contextually searchable experiences in a virtual environment by automatically interpreting avatar activity.

Example computer-based operations can include generating and rendering, at a computing device, a virtual environment that includes a sector having one or more virtual structures. A particular virtual structure in the one or more virtual structures can include a first level, a second level, and a navigation control structured to position an avatar on the respective first level or second level. Example computer-based operations can include detecting a first position of the avatar within the virtual environment. Example computer-based operations can include, in response to (1) determining, using the first position of the avatar, that the avatar is within a predetermined distance of the sector and (2) detecting that the sector is within a field of view for a visual output device connected to the computing device, performing various additional operations. Example computer-based additional operations can include generating a sector data layer, where the sector data layer comprises data items related to at least one of a job dataset, an educational institution dataset, a scholarship dataset, a survey dataset, or a skill dataset. Example additional computer-based operations can include binding a set of items in the sector data layer to the sector and configuring a first displayed attribute of the sector based on at least one first item from the set of items.

Further, example computer-based operations can include detecting a second position of the avatar. Example computer-based operations can include in response to (3) determining, using the second position of the avatar, that the avatar is positioned within the particular virtual structure of the sector, and (4) detecting a first interaction of the avatar with the navigation control, performing various further computer-based operations, such as: determining, based on the interaction, whether the avatar is positioned at the first level or the second level; generating a subset of data using the set of items in the sector data layer, the subset of data corresponding to a particular one of the first level and the second level; and/or configuring a second displayed attribute of the virtual structure based on the subset of data.

Further, example computer-based operations can include use cases where the subset of data is generated according to at least one of a filter rank or a target filter ratio included in the sector data layer. For example, based on at least one detected second interaction of the avatar with the navigation control, the platform can perform operations that include determining a next displayable attribute of the virtual structure prior to the next displayable attribute appearing in the field of view, dynamically refreshing the subset of data, configuring the next displayable attribute based on the refreshed subset of data, and causing the computing device to display the next displayable attribute. The subset of data can be stored in a directory linked to the virtual structure, and dynamically refreshing the subset of data based on the filter rank can include populating a subdirectory with data items selected from the subset of data based on the filter rank. The subset can be dynamically refreshed based on a filter rank.

The navigation options for various displayed attributes can include discrete values (e.g., separate doors, entryways, corridors, paths) and/or ranges (e.g., sliders, elevators).

In some implementations, generating the first data layer can include generating an inference regarding a particular user account represented by the avatar (for example, based on user survey results, interests, and so forth) and based on the inference, automatically generating a query for the data items. Generating the inference can include determining additional profile information associated with the particular user account. The generated inference can be based on the additional profile information, the additional profile information being at least one of an age, an academic record, a survey result, a career interest, geographical preference, a product interest, or an activity history. The additional information can be generated by merging first data related to a particular first category of interest and second data relating to a particular second category of interest.

As shown, the system 100 includes a user device 102 having a VR engine 112, network 125, network server 130, and external computing system 170.

The network 125 may be a computer network implementing wired and/or wireless connections between different entities, such as the user device 102, the network server 130, and the external computing system 170. The network 125 may implement any communication protocol known in the art. Non-limiting examples of communication protocols include a local area network (LAN), a wireless LAN, an internet protocol (IP) network, and a cellular network.

The user device 102 includes a user interface (UI) 105 which can include a display 106 (which may be a touch screen) such that a user of the user device 102 is able to visualize the VR content generated by the VR engine 112.

The UI 105 can also include a gesture recognition system, a speaker, headphones, a microphone, haptics, a keyboard, a mouse, and/or a game controller such as a joystick input device. The UI 105 may be at least partially implemented by wearable devices embedded in clothing and/or accessories including VR glasses, gloves, and/or body suits, for example. The UI 105 can present virtual content to a user, including visual, haptic and audio content.

The user device 102 also includes a network interface 108, one or more sensors 110, and the VR engine 112. The VR engine 112 within the user device 102 supports generation of the VR content. As illustrated, the VR engine 112 includes a processor 114 and memory 116. The processor 114 may be implemented by one or more processors that execute instructions stored in the memory 116 or in another non-transitory computer-readable medium. Alternatively, some or all of the processor 114 may be implemented using dedicated circuitry, such as an application specific integrated circuit (ASIC), a graphics processing unit (GPU) or a programmed field programmable gate array (FPGA).

The network interface 108 is provided for communicating over the network 125. The structure of the network interface 108 is implementation specific and will depend on how the user device 102 interfaces with the network 125. For example, if the user device 102 is a mobile phone, headset or tablet, then the network interface 108 may include a transmitter/receiver with an antenna to send and receive wireless transmissions to/from the network 125. If the user device is a personal computer connected to the network with a network cable, then the network interface 108 may include, for example, a network interface card (NIC), a computer port, and/or a network socket. In some implementations, a processor 103 of the user device 102 directly performs or instructs all of the operations performed by the user device 102. Examples of these operations include processing user inputs received from the UI 105, preparing information for transmission over the network 125, processing data received over the network 125, and instructing the display 106 to display information. The processor 103 may be implemented by one or more processors that execute instructions stored in a memory 104. Alternatively, some or all of the processor 103 may be implemented using dedicated circuitry, such as an ASIC, a GPU, or a programmed FPGA.

The network interface 108 is provided for communication over the network 125. The structure of the network interface 108 is implementation specific. For example, the network interface 108 may include a NIC, a computer port (e.g., a physical outlet to which a plug or cable connects), and/or a network socket.

The sensor 110 is provided to obtain measurements of the real-world environment surrounding the user device 102. These measurements can be used to generate representations of real-world spaces and/or 3D models of objects, for example. The representations of the real-world spaces and the 3D models of objects may be stored in the VR structure record 150.

Examples of the 3D models of objects can include various geometric shapes, such as spheres, cuboids, cubes, pyramids, cones, cylinders, or combinations of one or more geometric shapes. Other examples of the 3D models of objects can include 3D models generated using image files of real-world objects.

The 3D models of objects vary in dimensions and can be configured to move in pre-determined or random directions to mimic the real-world environment. In some implementations, after the 3D models of objects are generated, textures adding surface detail to the 3D models are implemented to create various effects such as roughness, shininess, and transparency. In some implementations, the 3D models of objects stored in the VR structure record 150 can be associated with additional audio content and/or haptic content. Alternatively or additionally, different materials are applied to the 3D models of objects to define how light interacts with surfaces of the 3D models.

In some implementations, the sensor 110 may include one or more cameras, radar sensors, lidar sensors and sonar sensors, for example. In the case of a camera, the captured images may be processed by the image analyzer 120. Measurements obtained from radar sensors, lidar sensors and sonar sensors can also be processed by the VR engine 112. Although the sensor 110 is shown as a component of the user device 102, the sensor 110 may also or instead be implemented separately from the user device 102 and may communicate with the user device 102 and/or the VR engine 112 via wired and/or wireless connections, for example.

In some implementations, the user device 102 has augmented reality (AR) capabilities. For example, an AR engine similar to the VR engine 112 could be implemented in part or in whole on the user device 102. A software application or instance may be installed on the user device 102 that generates virtual content locally (i.e., on the user device 102). The software application could receive virtual content from the network server 130.

Within the VR engine 112 is the processor 114 and the memory 116. The memory 116 stores an avatar location buffer 118, an image analyzer 120, and a memory executable 122.

The avatar location buffer 118 is provided to detect the location of an avatar associated with a user in a VR environment. In some implementations, the avatar location buffer 118 is enabled to identify the location of the user through coordinates, such as latitude and longitude coordinates within the VR environment. In other implementations, the avatar location buffer 118 identifies relative location of the user with respect to virtual structures in the VR environment. For example, the avatar location buffer 118 may identify that the avatar is located within a virtual building labeled "business."

For example, the location of the avatar can be expressed as a distance between the avatar and an origin in a Cartesian coordinate system of the VR environment comprising x, y, and z axes. The origin can refer to a common point where three orthogonal x y and z axes cross. In some implementations, the origin can refer to a specific object, such as a virtual building labeled "business," within the VR environment.

In some implementations, in addition to the coordinates of the location of the avatar, the avatar location buffer 118 receives information from a tracker installed on a user device that tracks position and orientation of the user's eyepoint to periodically monitor and update the location of the avatar. For example, the position and orientation of the user's eyepoint can be used to determine if the avatar is facing a particular object within the VR environment. In other implementations, in response to determining that the location of the avatar is constantly changing, the avatar location buffer 118 is configured to receive information of physical attributes of the avatar, such as linear and angular velocity, to further monitor the location of the avatar.

In some implementations, the avatar location buffer saves the last identified location of the avatar such that upon disconnecting from the VR environment and reconnecting, the avatar is spawned in the last identified location.

The image analyzer 120 is provided to analyze images received and/or stored by the VR engine 112. In some implementations, the image analyzer 120 is used to generate a representation of a real-world space based on one or more images of the real world space. Image analysis can detect the features of the real-world space, including the surfaces, edges and/or corners of the real-world space. Image analysis can also determine the dimensions and relative positions of these features of the real-world space in 3D. The representation of the real-world space can then be generated based in the VR environment based on the size, shape and position of the features, and optionally be stored in the network server 130.

In some implementations, the image analyzer 120 is used to generate virtual models of objects through photogrammetry, for example. These virtual models can be stored in the network server 130.

More than one image could be input into the image analyzer 120 at a time. For example, multiple images of a real-world space taken from different positions could allow for the determination of a broader and more accurate representation of the real-world space. The multiple images could be obtained from a video stream or from multiple different cameras, for example. In cases where the image analyzer 120 receives a video stream for a real-world space, the image analyzer 120 could perform an initial feature detection operation to locate the features of the real-world space. These features could then be tracked in subsequent images received from the video stream in real-time. New features that are detected in the subsequent images could be added to the representation of the real-world space to expand the representation of the real-world space.

The image analyzer 120 may be implemented in the form of software instructions that are executable by the processor 114. Different algorithms could be included in the image analyzer 120. Non-limiting examples of such algorithms include surface, corner and/or edge detection algorithms, object recognition algorithms, motion detection algorithms, and Image segmentation algorithms.

In some implementations, the memory 116 of the VR engine 112 includes one or more memory executables 122 that are structured to execute instructions in the VR environment.

The user device 102 is communicatively coupled to the network server 130 which generates, stores, and communicates various data to other entities in the network 125. The network server 130 includes filter engines 132, processor 142, database 144, and memory 146.

The filter engines 132 include filters for each level of virtual asset, such as virtual sector filters 134, virtual structure filters 136, virtual unit floor filters 138, and virtual unit room filters 140. The filter engines 132 are able to generate and modify multiple filters that are used to create and modify the VR environment as the user navigates through the VR environment. Each of the multiple filters includes an executable logic to create, modify, and/or combine objects of different levels as they appear in the VR environment. Accordingly, a "filter", as defined herein, can include executable logic to modify/transform various aspects models used to populate the VR environment (e.g., sector models, structure models, unit floor models, unit room models). The filters created by the filter engines 132 may be saved in a filter configuration store 148 within the memory 146.

The virtual sector filters 134, virtual structure filters 136, virtual unit floor filters 138, and virtual unit room filters 140 are filters that are triggered based on detecting a user interaction in the VR environment. For example, upon detecting user interaction with a given virtual sector in the VR environment, the virtual sector filter 134 can be triggered to modify the given virtual sector displayed in the VR environment to populate the given virtual sector with data items related to the given virtual sector and/or modify the given virtual sector by enlarging, protruding, or contrasting the given virtual sector with surrounding virtual sectors. Similarly, the virtual structure filter 136 can be triggered upon detecting user interaction with a given virtual structure in the VR environment to modify the given virtual structure to populate the given virtual structure with data items related to the given virtual structure and/or modify the given virtual structure by enlarging, protruding, or contrasting the given virtual structure with surrounding virtual structures. Filters for subsequent levels of the virtual asset serve similar purpose to modify virtual assets based on user interaction with the virtual assets.

The processor 142 may be implemented by one or more processors that execute instructions stored in the memory 146 or in another non transitory computer readable medium. Alternatively, some or all of the processor 142 may be implemented using dedicated circuitry, such as an application specific integrated circuit (ASIC), a graphics processing unit (GPU) or a programmed field programmable gate array (FPGA).

The database 144 can include an object store, prompt store, and/or a prompt response store. An object store can be structured to store information associated with objects, such as descriptions of available career options for a given sector, or a list of colleges to be recommended to the user and information associated with each college identified in the list of colleges. A prompt store can be structured to store stubs of prompts, such as "what are typical professions available for an individual with an undergraduate degree in business?" or "what are available choices for a high school student who would like to pursue a career in nursing?" A prompt response store can be structured to store stubs of prompt response options associatively linked to items in the prompt store.

The memory 146 can include the filter configuration store 148, VR structure record 150, VR content generator 152, and memory executable 154.

The VR structure record 150 stores virtual models of items, buildings, locations, scenery, people, anatomical features, animals and/or any other types of virtual asset in the VR environment. The virtual models can be implemented within the VR experience for one or more users, allowing the users to view and optionally interact with the virtual models.

Any, one, some or all of the virtual models stored in the virtual model record 150 may be three-dimensional (3D) models. A 3D model is a mathematical representation of an entity that is defined with a length, width and height. A 3D model can be positioned or otherwise defined within a 3D virtual coordinate system, which could be a cartesian coordinate system, a cylindrical coordinate system or a polar coordinate system, for example. A 3D model might be anchored to the origin of the virtual coordinate system such that the 3D model is at the center of the virtual coordinate system. A 3D model may be entirely computer-generated or may be generated based on measurements of a real-world entity. Possible methods for generating 3D models from a real-world entity include photogrammetry (creating a 3D model from a series of 2D images), and 3D scanning (moving a scanner around the object to capture all angles).

A 3D model allows an object to be viewed at various different angles in the VR experience. Further, when a user is viewing the VR content using a device with 3D capabilities (such as a headset, for example), the 3D model allows for 3D representations of the object to be generated and included in the VR content. For example, 3D representations of an object might be achieved by displaying slightly different perspectives of the object in each eye of a user, giving the object a 3D effect.

A model stored in the VR structure record 150 can also have associated audio content and/or haptic content. For example, the VR structure record 150 could store sounds made by or otherwise associated with a model and/or haptic feedback that can provide a feel of a model.

The virtual models in the VR structure record 150 could be obtained in any of a number of different ways. In some implementations, at least some of the virtual models are obtained from a user of the VR engine 112. The virtual models may also be obtained from the database 144, or from other entities such as the external computing system 170. In addition, some virtual models may be generated locally at the VR engine 112. For example, images or scans that are obtained by the VR engine 112 can be used to generate a 3D model.

The VR structure record 150 also stores representations of real-world and/or virtual spaces. A representation of a real-world space can define a real-world environment that may be overlaid with virtual content to provide augmented reality (AR) content, and a representation of a virtual space can define a computer-generated environment that may be overlaid with virtual content to provide VR content. A representation of a space could be user-specific. For example, a representation of a space could be obtained from and/or generated specifically for a particular user. However, this might not always be the case. A representation of a space could instead be generic or personalized only in part.

A representation of a space generally provides spatial information pertaining to the features of the space, including the boundaries of the space (for example, the walls of a room) and the objects within the space (for example, the structures and people in a room). The spatial information can identify any, some or all of the features in the space, and provide the position (including the location and orientation) and the dimensions of the features in the space. Non-limiting examples of such features include the surfaces, edges and corners in the space. In other words, the representation of the space may provide a topographical map, layout, or model of the space in 3D.

In some cases, a representation of a real-world space corresponds to a real-world room, building, area or other physical environment. For example, a representation of a real-world space can include, or be generated from, measurements captured by a user device. These measurements may include one or more optical images, radar scans, lidar scans and/or sonar scans of the space, for example. The representation of the real world space can be continuously or intermittently updated as new measurements are received. In some implementations, a representation of a real-world space can be generated by a simultaneous localization and mapping (SLAM) process. An example space can include, for instance, a hospital, a college campus, a factory, an office, a forest, a spaceship, and so forth.

As noted above, a representation of a space stored in the VR structure record 150 can be computer-generated. An example of a computer-generated representation of a space is a computer-generated 3D model defining the boundaries of a virtual space and any objects within the virtual space.

The VR content generator 152 employs and/or implements one or more algorithms (possibly in the form of software instructions executable by the processor 142) that are capable of generating virtual content for one or more users. This virtual content could form the basis of the VR content that is generated for a user in the VR environment. Non-limiting examples of the VR content include virtual representations of one or more objects in the VR environment, such as sectors, buildings, floors within the buildings, and rooms within the floors, virtual representations of one or more users, such as avatars associated with the one or more users, and virtual representations of one or more interactions between the one or more users and the objects in the VR environment, such as the virtual representation of the interaction between an avatar associated with a user and a virtual building in the VR environment. In some implementations, the VR content generator 152 is able to execute artificial intelligence (AI) or machine learning (ML) executables to generate the VR content.

To generate virtual content for a particular user, possible input to the VR content generator 152 includes one or more virtual models defined within a virtual coordinate system. The virtual models may be obtained from the VR structure record 150, for example. Another input to the VR content generator 152 includes a representation of a real-world or virtual space associated with a user. The representation of the space may also be obtained from the VR structure record 150.

In some implementations, an anchor point for the virtual coordinate system within the representation of the space to map the virtual coordinate system to the space can be used as input to the VR content generator 152. The anchor point may be received from a user device. In other implementations, inputs to the VR content generator 152 include a location of the user within the virtual coordinate system, a location of one or more other users within the virtual coordinate system, or a location of one or more interactions between the one or more users and the objects in the VR environment within the virtual coordinate system.

The VR content output by the VR content generator 152 can include visual, haptic and/or audio content. Visual content can allow a user to view virtual objects within the VR environment; haptic content can allow a user to touch and feel virtual objects within the VR environment, and audio content can allow a user to hear sounds within the VR environment. In some implementations, visual, haptic and/or audio content is generated based on the position (including a location and orientation) of one or more users within a virtual coordinate system of the VR environment. For example, visual content for a user can depict an object based on the relative position of the user to a model of the object in the virtual coordinate system. Haptic content can provide the sensation of touching or feeling an object based on the one or more anatomical features of the user that are abutting the object in the virtual coordinate system. Haptic content might be implemented, at least in part, using clothing with built-in haptics, for example. Audio content can implement spatial audio with a directionality corresponding to the position of the user relative to a source of the audio content within the virtual coordinate system. In some implementations, spatial audio is produced by independently controlling the sounds played into each ear of a user.

Consider an example of VR content that is generated for a particular user in the VR environment. The VR content could include visual content depicting an object in the VR environment, haptic content providing a feel of the object, and audio content providing a sound made by the object. The size and position of the object depicted in the visual content may correspond to the position of a user relative to the object in a virtual coordinate system of the VR environment. Similarly, the directionality of the audio content may correspond to the position of the user relative to the object in the virtual coordinate system. If the object is to the left of the user, then audio content for the object might be louder in the left ear of the user. The haptic content might be based on which part of the user is touching the object (for example, if the user is touching the object with their finger or their palm) and which part of the object the user is touching in the virtual coordinate system.

The VR content can be continuously or intermittently updated by the VR content generator 152 to reflect changes and/or modifications in the VR environment. If the user moves within a virtual coordinate system of the VR environment, then new VR content can be generated to reflect the new position of the user within the virtual coordinate system. For example, when the user moves relative to a virtual model of objects in the virtual coordinate system, then the size and orientation of a render of the model can change accordingly. Similar comments apply to audio content and haptic content included in the VR content for the user, which can also change when the user moves.

In some implementations, the virtual content generated for a user by the VR content generator 152 is AR content. The AR content is overlaid onto a real-world space surrounding the user, providing the user with an AR experience. This can include overlaying the AR content on an image of the real-world space captured by a camera, for example. Alternatively, the AR content can be overlaid onto the real-world space using a transparent display in an AR headset, for example. The AR content can be generated based on a representation of the real-world space that is stored in the VR structure record 150.

In some implementations, the virtual content provided for a user by the VR content generator 152 is VR content. The VR content includes one or more virtual representations of objects, users and/or user interactions that are overlaid on a representation of a virtual space. Accordingly, the VR content can be entirely computer generated. The representation of the virtual space could be obtained from the VR structure record 150, for example.

In some implementations, the VR content generator 152 provides a shared VR experience for multiple users. The VR content generated for each of the multiple users can be based on a single virtual coordinate system that defines one or more virtual models of objects, users and/or user interactions. Each user in the shared VR experience can have a position (including a location and orientation) within the virtual coordinate system, and the virtual content generated for each user may depend on their position.

It should be noted that the VR content might not always be generated for all users in the shared VR experience. In some implementations, the shared VR experience provides a combination of AR content and VR content.

Although the image analyzer 120 and the VR content generator 152 are illustrated as separate units, this is only an example. Some embodiments could combine the functionality of the image analyzer 120 and the virtual content generator 152 in a single software instance stored in the memory 146 of the network server 130 or in another non-transitory computer readable medium.

The VR content that is generated by the VR engine 112 can be output to multiple user devices. As such, the user devices can enable respective users to engage with the shared VR experience. Non-limiting examples of a user device include a mobile phone, tablet, laptop, projector, headset and computer. In some implementations, one or more of the user devices include implanted devices or wearable devices, such as a device embedded in clothing material or a device that is worn by a user such as glasses, with built-in displays allowing a user to view the real-world and simultaneously view VR content that is overlaid on the real-world.

The VR engine 112 is described by way of example. Other implementations of the VR engine are also contemplated. In some implementations, the VR engine is provided at least in part by a computing platform, either as a core function of the platform or as an application or service supported by or communicating with the computing platform. The computing platform can be a platform that displays and filters products/services by categories represented by virtual structures in the VR environment—for instance, an e-commerce platform, an educational technology platform, a gaming platform, an entertainment platform, a social networking platform, a and so forth. The products/services that are displayed in the platform can include, but not be limited to, information stored in and retrieved from a preconfigured dataset such as a job dataset, an educational institution dataset, a scholarship dataset, a survey dataset, or a skill dataset. In some implementations, the platform can be a platform that displays products/services associated with sports, such as sports teams, players, brackets, each represented by virtual structures in the VR environment.

In some implementations, the VR engine is implemented at least in part by a user device. In some implementations, the VR engine is implemented as a stand-alone service to generate VR content. While the VR engine 112 is shown as a single component, the VR engine could instead be provided by multiple different components that are in communication via the network 125.

Figure 2A:
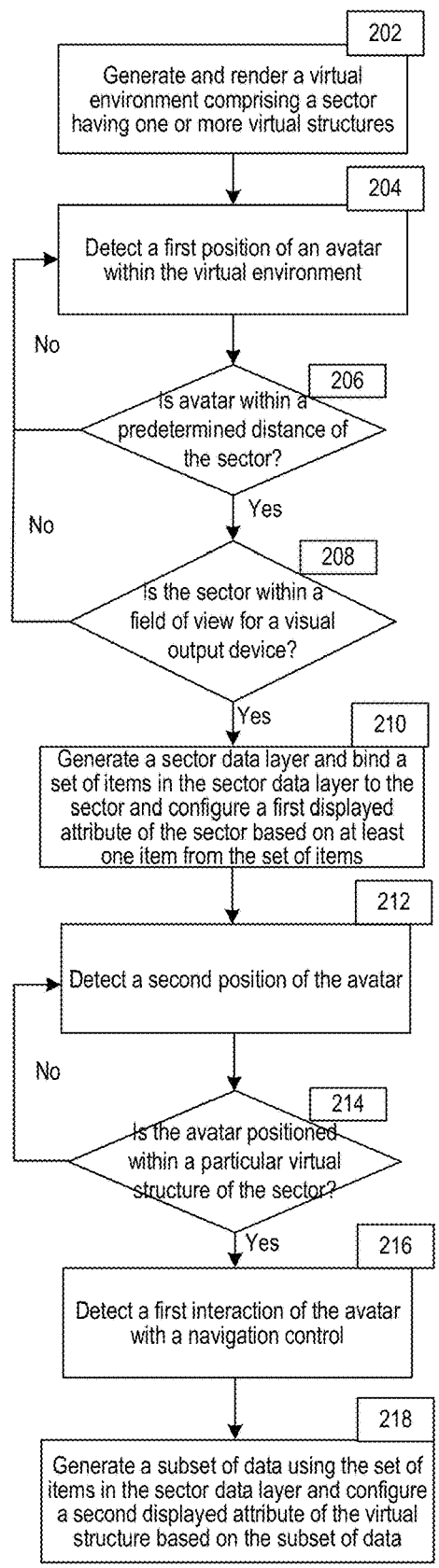
FIG. 2A is a flowchart illustrating a method of generating representations of searchable experiences in a virtual environment, according to some implementations.

FIG. 2A is a flowchart illustrating a method of generating representations of searchable experiences in a virtual environment, according to some implementations. Other implementations of the method include additional, fewer, or different steps or performing the steps in different orders.

At operation 202, a virtual environment comprising a sector having one or more virtual structures is generated and rendered at a computing device. The virtual environment may include one or more sectors each having an identifiable theme such that one or more virtual structures within the same sector share common features.

At operation 204, a first position of the avatar of the user accessing the virtual environment is detected. At operation 206, whether the avatar is within a predetermined distance of the particular sector is determined. If the avatar is within the predetermined distance of the particular sector, the system proceeds to operation 208. Otherwise, the system returns to operation 206 to determine again if the avatar is within the predetermined distance.

At operation 208, whether the particular sector is within a field of view for a visual output device is determined. If the particular sector is within the field of view, the system proceeds to operation 210. Otherwise, the system returns to operation 206 to restart the avatar detection process.

At operation 210, upon determining that the particular sector is within the field of view for the visual output device being used by the user to access the virtual environment, a sector data layer is generated. The sector data layer may include data items related to at least one preconfigured dataset, such as a job dataset, an educational institution dataset, a scholarship dataset, a survey dataset, or a skill dataset. In some implementations, the dataset is communicatively coupled to an external database or the database 144 of the network server 130 such that the dataset is updated periodically to reflect information stored in the external database or the database 144 of the network server 130.

In some embodiments, the sector data layer includes a filter rank or a target filter ratio, and the datasets and subsets of data are generated accordingly. A filter rank refers to a rank of priorities assigned to each of the multiple filters generated by the filter engines 132 and stored in the filter configuration store 148 of the network server 130. The filter rank or the target filter ratio can be predetermined and saved in the filter configuration store 148. In some implementations, the user accessing the virtual environment may modify the filter rank or the target filter ratio. The datasets are stored in a directory linked to the virtual structure, and the subsets of data are stored in a subdirectory. Target filter ratios help administrators of the platform to arrange the order of questions for a filter. For instance, sectors can at a minimum contain two virtual structures. At a maximum, a virtual sector can contain up to a predetermined number of virtual structures (e.g., 20). Therefore, the max/min filter ratios in this example can be 1:2/1:20. An example target filter ratio can be between 1:5 and 1:10.

In some embodiments, the datasets and the subsets of data can be dynamically refreshed based on the filter rank by populating the subdirectory with data items selected from a subset of data based on the filter rank. In other embodiments, the subsets of data are generated by merging datasets representing multiple categories of interest (e.g., skills and jobs), wherein the categories of interest are determined based on inferences made regarding a particular user account (e.g., an outcome of a pattern recognition skills assessment based on an in-game survey). The categories can be further correlated to other categories. For example, if an individual's pattern recognition skills exceed a predetermined threshold (e.g., 70/100, 80/100), a subset of data can be merged with another dataset that includes jobs where pattern recognition abilities are desired (e.g., radiology jobs).

In another example, for a virtual environment designated to give a user information regarding career options or opportunities, a particular sector may have an engineering theme and will thus be configured to provide information saved in the job dataset to the user accessing the virtual environment. The sector can include multiple virtual structures, each representing different career fields available within the engineering sector, such as biomedical engineering, electrical engineering, mechanical engineering, etc. The virtual structures within the engineering sector therefore each represent a virtual interactable building wherein the user of the virtual environment is enabled to obtain information about various engineering fields. When the virtual structures are presented in the virtual environment, the method in which the virtual structures are presented may differ based on the filter rank assigned to each of the multiple filters. For example, the order may assign a higher rank to a filter associated with electrical engineering as compared to biomedical engineering or mechanical engineering, resulting in the virtual structure representing electrical engineering appearing in front of or larger than the virtual structures representing other branches of engineering. As previously explained, in addition to having the capacity to rank items, the filters described herein can also cause (e.g., via executables) customization, modification, and/or combination of 3D models generated to represent a particular item.

After the sector data layer is generated, a set of items in the sector data layer is bound to the sector. Consequently, a first displayed attribute of the sector is configured based on at least one item from the set of items. Referring to the above example regarding the engineering sector, the set of items may include datasets containing information regarding different fields of engineering. After determining that the avatar of the user is within the predetermined distance of the engineering sector and the engineering sector is within the field of view for the visual output device of the user, the sector is configured to display one or more virtual structures each representing different fields of engineering, based on the job dataset stored in the external database or the database 144 of the network server 130.

At operation 212, a second position of the avatar accessing the virtual environment is detected. In some embodiments, the second position refers to the avatar's position relative to a virtual structure in the virtual environment.

At operation 214, whether the avatar is positioned within or within a proximity of a particular virtual structure of the sector is determined. If the avatar is determined to be positioned outside or outside the proximity of the particular virtual structure, the system returns to operation 212 to detect the second position of the avatar. If the avatar is determined to be within or within a proximity of the particular virtual structure of the sector, the system proceeds to operation 216.

At operation 216, upon detecting that the avatar is within the particular virtual structure, the system may perform periodic checks to detect a first interaction of the avatar with a navigation control. In some implementations, a virtual structure may include one or more levels or floors, wherein each level or floor represents a particular division within the virtual structure. The user may navigate to and from a floor to another using a navigation control, such as a door, an elevator, or an escalator.

Referring back to the above example regarding the engineering sector, the virtual structure representing biomedical engineering may include floors labeled biomedical geneticist, lab technician, biomedical physician scientist, biomedical engineer, etc. such that each floor represents a career field that a user may pursue after obtaining a degree in biomedical engineering. Additionally or alternatively, the virtual structure representing biomedical engineering may display professions based on average salary ranges associated with each of the careers, such that each floor of the virtual structure displays one or more professions associated with biomedical engineering within a given salary range. For example, the first floor of the virtual structure can be configured to display careers with average salaries between $50,001 and $70,000, the second floor of the virtual structure can be configured to display professions with average salaries between $70,001 and $100,000, etc.

In other implementations, the levels or floors within the virtual structure represent differing layers of related information. For example, the first floor of the virtual structure representing biomedical engineering may include information regarding different professions the user may pursue after obtaining a degree in biomedical engineering, such as a biomedical geneticist, a lab technician, a biomedical physician scientist, a biomedical engineer, or a medical doctor. After receiving input from the user that the user desires to learn more about becoming a doctor and subsequently detecting the first interaction of the avatar with the navigation control indicating the avatar is moving to the second floor, the second floor of the virtual structure representing biomedical engineering careers with average salaries between $70,001 and $100,000 can include information regarding different types of doctors, such as internal medicine, orthopedics, pediatrics, or neurology. The input from the user can be any indication made by the user that signals the user's intent, including, but not limited to, the user moving the avatar to a specific location within the virtual environment or the user interacting with/clicking on a virtual object within the virtual environment. Subsequently, the system can be equipped to provide further information on subdivisions of the types of doctors, or higher-level careers within biomedical engineering, on the third floor of the virtual structure upon receiving input from the user that the user desires to learn more about becoming a particular type of doctor and detecting a second interaction of the avatar with the navigation control indicating the avatar is moving to the third floor. Alternatively or additionally, on subsequent floors, the system can be equipped to categorize the types of doctors based on an average salary range associated with each type.

Figure 2B:
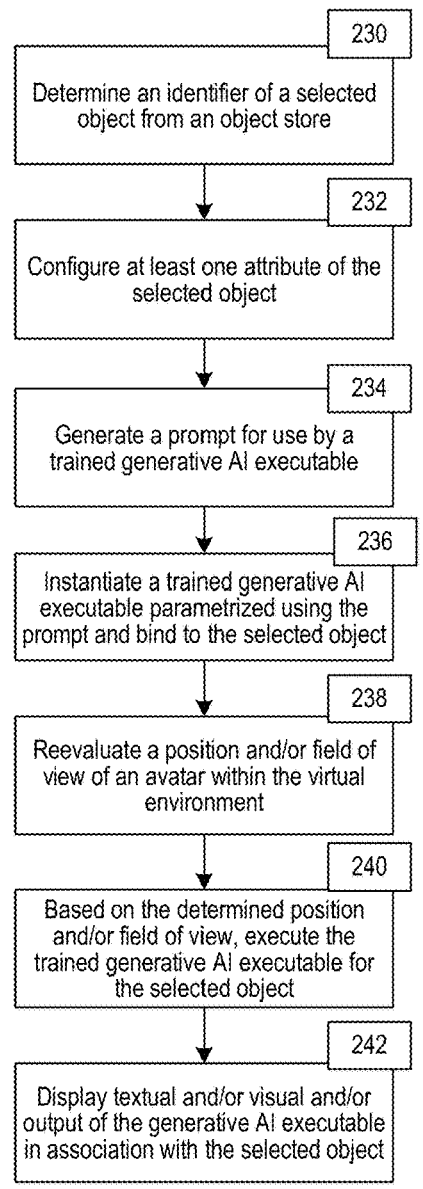
FIG. 2B is a flowchart illustrating a method of incorporating generative artificial intelligence (AI) technology to provide information in the representations of searchable experiences in the virtual environment, according to some implementations.

FIG. 2B is a flowchart illustrating a method of using generative artificial intelligence (AI) technology to populate (e.g., to provide information in connection with) the representations of searchable experiences in the virtual environment, according to some implementations.

As shown in operation 230, in some implementations, in association with operation 210 of FIG. 2A, in order to configure the first displayed attribute (e.g., textual or visual representation of data items related to a job dataset, an educational institution dataset, a scholarship dataset, a survey dataset, a skill dataset, etc.) of the sector, the system determines an identifier of a selected object from an object store. The object can be any virtual asset in the virtual environment, but at least in association with operation 210 of FIG. 2A, an example object is a sector. The displayed attributes can include icons, graphics, text, prompts, outputs of AI executables, hyperlinks (e.g., hyperlinks to external websites, downloadable applications), audio, or any combinations of the above.

At operation 232, at least one attribute of the selected object is configured. If a sector representing jobs available is selected, the attribute can be a profession stored in the job dataset. Alternatively, if a sector representing educational institutions is selected, the attribute can be an institution stored in the educational institution dataset. This can be implemented in various ways. For example, the user of the virtual environment may communicate an indication to the network 125 that the user would like to obtain more information regarding professions available in a business sector. The user may further communicate that the user would like for the information to be based on a particular dataset stored in the external database or the database 144 of the network server 130.

The indication of the user can be determined using multiple factors, including detected positions of the avatar representing the user's intent or tracker information tracking the user's eyepoint. In some implementations, in addition to the detected positions of the avatar and the tracker information, the user is enabled to provide additional indications of intent such as a spoken query and/or interactions with one or more virtual assets in the virtual environment such as clicking or selecting the one or more virtual assets in the virtual environment.

At operation 234, a prompt for use by a generative AI executable is generated. The prompt may be selected from a prompt store stored in the database 144, or the prompt may be generated by an operator of the virtual environment based on various factors, such as availability of information in one or more datasets, memory capacity of the VR engine 112, etc. Referring to the above example regarding the object being a business sector, the prompt that may be used by the generative AI executable can be: "List three reasons why [a user of the virtual environment] may wish to pursue a career in the business sector." Accordingly, in some implementations, the prompt can be generated and/or instantiated for the user such that the prompt is further parametrized, through automatic and contextual prompt engineering, with user-specific information and/or attributes determined using information stored in a user's profile and/or linked information. For example, if a particular user's additional interests include art, the AI prompt can be structured to include this information, as contextual instructions, in order to cause the generative AI executable to return information pertinent to the art business. If a particular user has advanced pattern recognition skills, the AI prompt can be structured to include this information, as contextual instructions, to return information pertaining to data science. And, if both are true, the generated prompt can include even more precise contextual instructions to personalize output returned by the AI executable (e.g., return information pertaining to data visualization in data science).

At operation 236, the generative AI executable is parametrized using the generated prompt and is bound to the selected object. As a result, the object now includes a built-in prompt to feed to an AI/ML system, such as the system described in relation to FIG. 3A.

The generative AI executable can include or reference a trained AI/ML model, such as a transformer, neural network, diffusion-based model, and so forth. As part of the process of parametrizing the generative AI executable, the system can automatically parse, extract, or generate items or tokens for the prompt. The items or tokens can correspond to a list of input features for the generative AI executable. The input features can be constructed based on any of a job dataset, an educational institution dataset, a scholarship dataset, a survey dataset, or a skill dataset, or suitable combinations thereof. The generative AI executable can be trained on a training dataset, which can include modified and/or transformed items that facilitate generation of the desired outputs given the prompt. The training data can be sourced from any datastores described herein, such as the database 144, filter configuration store 148, and/or VR structure record 150 (or external data). Examples of modifications and/or transformations applied to the sourced data to generate training data can include generating classifications, concatenations, derivatives, synthetic data items, aggregations that reduce the number of data items, and so forth. For example, sector or structure data (e.g., data on careers represented by sectors) can be labeled with categories, such as nursing, surgery, pharmacy, and so forth. In some examples, the labels can be automatically generated by executing a mapping function that maps a data item (e.g., college, major, job title, degree type) to a category or by otherwise modifying, transforming, or summarizing input data. In some examples, the labels can be automatically generated by linking items from semantically different datasets (such as, for example, linking a job dataset and a skill dataset to generate a set of transferable skills used in classifying items in a particular dataset, thereby augmenting the classified items with previously unavailable information).

The labeled sector data can be fed to a classifier-based neural network of the generative AI executable to train the neural network to automatically make inferences regarding classifications based on items seen in input data (e.g., inferences regarding a particular user account based on the avatar in the virtual environment and/or additional instances of a job dataset, an educational institution dataset, a scholarship dataset, a survey dataset, or a skill dataset). In some embodiments, automatically making inferences includes determining an additional profile information associated with a particular user account, including age, academic record, a survey result, a career interest, geographical preference, a product interest, and/or an activity history.

As the user continues to interact with the environment, at operation 238, the system reevaluates the position and the field of view of the avatar within the virtual environment. Upon determining the avatar is within the predetermined distance of the selected object and that the selected object is within the field of view for the visual output device, the generative AI executable for the selected object is executed, at 240. Advantageously, conditional execution of the generative AI executable at the time the information is needed (based on determining the user's intent or another indicator) enables the platform to leverage AI-based functionality in a way that reduces the impact on system resources and provides just-in-time information.

At operation 242, textual and/or visual and/or audio output of the generative AI executable in association with the selected object is displayed in the virtual environment. Referring again to the above example regarding the business sector, after determining that the avatar of the user is within the predetermined distance of the business sector and the business sector is within the field of view for the visual output device, the generative AI executable runs the prompt and correspondingly generates an output, which includes information regarding the business sector as well as AI generated responses to the prompt. Accordingly, the output returned by the trained model can be included in the environment where the avatar is positioned. For example, the output can be included in a pop-up message, video message, and/or audio message. As another example, the output can trigger application and/or generation of filters (for instance, applying a visual emphasis mask to rendered items whose descriptors are included in the output set or correspond to items in the output set, greying out or otherwise deemphasizing other items in the environment, and so forth.)

As the user continues to interact with the environment so modified, the process can repeat to generate additional AI-based enhancements to the virtual environment. Advantageously, the corresponding executables and models are executed as needed, based on detecting user interactions, which enables a balance between customizing the environment and optimizing the use of computing resources (e.g., network bandwidth) needed to execute a prompt and return AI-generated output.

Figure 3A:
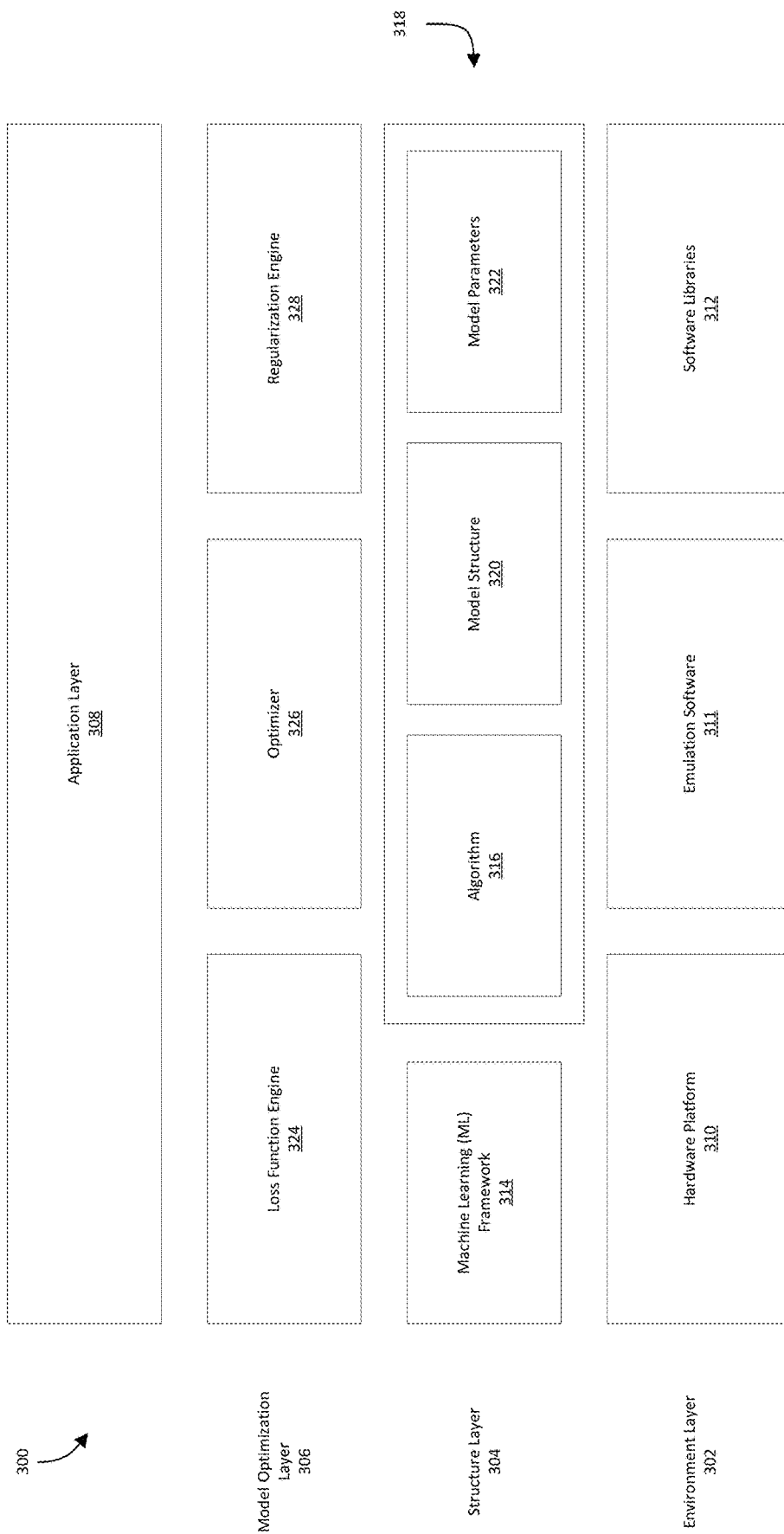
FIG. 3A illustrates a layered architecture of the AI system 300 that can implement the AI/ML models executed by the VR content generator 152 of FIG. 1 to generate the VR content, in accordance with some implementations of the present technology.

Example Embodiments of the AI Engine of the Platform for Generating Representations of Searchable Experiences in the Virtual Environment FIG. 3A illustrates a layered architecture of the AI system 300 that can implement the AI/ML models executed by the VR content generator 152 of FIG. 1 to generate the VR content, in accordance with some implementations of the present technology.

As shown according to FIG. 3A, the AI system 300 can include a set of layers, which conceptually organize elements within an example network topology for the AI system's architecture to implement a particular AI model (e.g., the generative AI executable(s) described herein). Generally, an AI model is a computer-executable program implemented by the AI system 300 that analyzes data to make predictions. In some implementations, the AI model can include various other models, such as neural networks trained to identify entities in pre-processed input data, classify entities in pre-processed input data, identify recurrence and other patterns in pre-processed input data, generate indexes, generate smart variables, generate indicators, and so forth.

In the AI model, information can pass through each layer of the AI system 300 to generate outputs for the AI model. The layers can include an environment layer 302, a structure layer 304, a model optimization layer 306, and an application layer 308. An algorithm 316, a model structure 320, and model parameters 322 of the structure layer 304 together form an example AI model 318. A loss function engine 324, an optimizer 326, and a regularization engine 328 of the model optimization layer 306 work to refine and optimize the AI model, and the environment layer 302 provides resources and support for application of the AI model by the application layer 308.

The environment layer 302 acts as the foundation of the AI system 300 by preparing data for the AI model. As shown, the environment layer 302 can include three sub-layers: a hardware platform 310, an emulation software 311, and one or more software libraries 312. The hardware platform 310 can be designed to perform operations for the AI model and can include computing resources for storage, memory, logic and networking, such as the resources described in relation to FIGS. 4 and 5. The hardware platform 310 can process amounts of data using one or more servers. The servers can perform backend operations such as matrix calculations, parallel calculations, machine learning (ML) training, and the like. Examples of servers used by the hardware platform 310 include central processing units (CPUs), graphics processing units (GPUs), neural processing units (NPUs), and system-on-chips (SoC). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. NPUs are specialized circuits that implement the necessary control and arithmetic logic to execute machine learning algorithms. NPUs can also be referred to as tensor processing units (TPUs), neural network processors (NNPs), intelligence processing units (IPUs), and vision processing units (VPUs). SoCs are IC chips that comprise most or all components found in a functional computer, including an on-chip CPU, volatile and permanent memory interfaces, I/O operations, and a dedicated GPU, within a single microchip. In some instances, the hardware platform 310 can include Infrastructure as a Service (IaaS) resources, which are computing resources (e.g., servers, memory, etc.) offered by a cloud services provider. The hardware platform 310 can also include computer memory for storing data about the AI model, application of the AI model, and training data for the AI model. The computer memory can be a form of random-access memory (RAM), such as dynamic RAM, static RAM, and non-volatile RAM.

The emulation software 311 provides tools for building virtual environments on the hardware platform 310 to simulate operating systems (e.g., Windows, Linux, MacOS, etc.), and their respective protocols, that are not native to the computing system of the hardware platform 310. Thus, emulating operating systems on the hardware platform 310 allows cross-compatible application and deployment of the AI model 318 across multiple devices and computing systems. Examples of emulation software 311 include Docker and VirtualBox.

The software libraries 312 can be thought of as suites of data, programming code, including executables, used to control and optimize the computing resources of the hardware platform 310. The programming code can include low-level primitives (e.g., fundamental language elements) that form the foundation of one or more low-level programming languages, such that servers of the hardware platform 310 can use the low-level primitives to carry out specific operations. The low-level programming languages do not require much, if any, abstraction from a computing resource's instruction set architecture, allowing them to run quickly with a small memory footprint. Examples of software libraries 312 that can be included in the AI system 300 include software libraries Intel Math Kernel Library, Nvidia cuDNN, Eigen, and Open BLAS. The software libraries 312 also feature distribution software, or package managers, that manage dependency software. Distribution software enable version control of individual dependencies and simplified organization of multiple collections of programming code. Examples of distribution software include PyPI and Anaconda.

The structure layer 304 can include an ML framework 314 and an algorithm 316. The ML framework 314 can be thought of as an interface, library, or tool that allows users to build and deploy the AI model. The ML framework 314 can include an open-source library, an application programming interface (API), a gradient-boosting library, an ensemble method, and/or a deep learning toolkit that work with the layers of the AI system to facilitate development of the AI model. For example, the ML framework 314 can distribute processes for application or training of the AI model across multiple resources in the hardware platform 310. The ML framework 314 can also include a set of pre-built components that have the functionality to implement and train the AI model and allow users to use pre-built functions and classes to construct and train the AI model. Thus, the ML framework 314 can be used to facilitate data engineering, development, hyperparameter tuning, testing, and training for the AI model. Examples of ML frameworks 314 that can be used in the AI system 300 include TensorFlow, PyTorch, Scikit-Learn, Scikit-Fuzzy, Keras, Cafffe, LightGBM, Random Forest, Fuzzy Logic Toolbox, and Amazon Web Services (AWS).

The ML framework 314 serves as an interface for users to access pre-built AI model components, functions, and tools to build and deploy custom designed AI systems via programming code. For example, user-written programs can execute instructions to incorporate available pre-built structures of common neural network node layers available in the ML framework 314 into the design and deployment of a custom AI model. In other implementations, the ML framework 314 is hosted on cloud computing platforms offering modular machine learning services that users can modify, execute, and combine with other web services. Examples of cloud machine learning interfaces include AWS SageMaker and Google Compute Engine. In other implementations, the ML framework 314 also serves as a library of pre-built model algorithms 316, model structure 320, and trained parameters 322 with predefined input and output variables that allow users to combine and build on top of existing AI models. Examples of ML frameworks 314 with pretrained models include Ultralytics and MMLab.

The algorithm 316 can be an organized set of computer-executable operations used to generate output data from a set of input data and can be described using pseudocode. The algorithm 316 can include complex code that allows the computing resources to learn from new input data and create new/modified outputs based on what was learned. In some implementations, the algorithm 316 can build the AI model through being trained while running computing resources of the hardware platform 310. This training allows the algorithm 316 to make predictions or decisions without being explicitly programmed to do so. Once trained, the algorithm 316 can run at the computing resources as part of the AI model to make predictions or decisions, improve computing resource performance, or perform tasks. The algorithm 316 can be trained using supervised learning, unsupervised learning, semi-supervised learning, and/or reinforcement learning.

Using supervised learning, the algorithm 316 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected from various source computing systems or data saved in one or more databases. The user may label the training data based on one or more classes and trains the AI model by inputting the training data to the algorithm 316. The algorithm determines how to label the new data based on the labeled training data. The user can facilitate collection, labeling, and/or input via the ML framework 314. In some instances, the user may convert the training data to a set of feature vectors for input to the algorithm 316. For example, the user may convert certain images for a particular model definition into vectors to enable images to be searched by the model. Once trained, the user can test the algorithm 316 on new data to determine if the algorithm 316 is predicting accurate labels for the new data. For example, the user can use cross-validation methods to test the accuracy of the algorithm 316 and retrain the algorithm 316 on new training data if the results of the cross-validation are below an accuracy threshold.

Using supervised learning, the algorithm 316 can be trained to learn patterns (e.g., match input data to output data) based on labeled training data, such as model data, sector data, structure data, filter data, career data, user interest data, and so forth.

Supervised learning can involve classification and/or regression. Classification techniques involve teaching the algorithm 316 to identify a category of new observations based on training data and are used when the input data for the algorithm 316 is discrete. Said differently, when learning through classification techniques, the algorithm 316 receives training data labeled with categories (e.g., classes) and determines how features observed in the training data (e.g., model attributes, sector attributes, structure attributes, filter attributes, career attributes, user interest attributes) relate to the categories. Once trained, the algorithm 316 can categorize new data by analyzing the new data for features that map to the categories. Examples of classification techniques include boosting, decision tree learning, genetic programming, learning vector quantization, k-nearest neighbor (k-NN) algorithm, and statistical classification.

Federated learning (e.g., collaborative learning) can involve splitting the model training into one or more independent model training sessions, each model training session assigned an independent subset training dataset of the training dataset. The one or more independent model training sessions can each be configured to train a previous instance of the model 318 using the assigned independent subset training dataset for that model training session. After each model training session completes training the model 318, the algorithm 316 can consolidate the output model, or trained model, of each individual training session into a single output model that updates model 318. In some implementations, federated learning enables individual model training sessions to operate in individual local environments without requiring exchange of data to other model training sessions or external entities. Accordingly, data visible within a first model training session is not inherently visible to other model training sessions.

Regression techniques involve estimating relationships between independent and dependent variables and are used when input data to the algorithm 316 is continuous. Regression techniques can be used to train the algorithm 316 to predict or forecast relationships between variables. To train the algorithm 316 using regression techniques, a user can select a regression method for estimating the parameters of the model. The user collects and labels training data that is input to the algorithm 316 such that the algorithm 316 is trained to understand the relationship between data features and the dependent variable(s). Once trained, the algorithm 316 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations. For example, a particular generative AI executable can be trained to operate on pre-processed data that includes imputed (automatically filled-in) data on career categories, transferable skills, income ranges, user attributes, and so forth.

Under unsupervised learning, the algorithm 316 learns patterns from unlabeled training data. In particular, the algorithm 316 is trained to learn hidden patterns and insights of input data, which can be used for data exploration or for generating new data. Here, the algorithm 316 does not have a predefined output, unlike the labels output when the algorithm 316 is trained using supervised learning. Said another way, unsupervised learning is used to train the algorithm 316 to find an underlying structure of a set of data, group the data according to similarities, and represent that set of data in a compressed format. The platform can use unsupervised learning to identify patterns in input data.

The model optimization layer 306 implements the AI model using data from the environment layer 302 and the algorithm 316 and ML framework 314 from the structure layer 304, thus enabling decision-making capabilities of the AI system 300. The model optimization layer 306 can include the model structure 320, model parameters 322, a loss function engine 324, an optimizer 326, and/or a regularization engine 328.

The model structure 320 describes the architecture of the AI model of the AI system 300. The model structure 320 defines the complexity of the pattern/relationship that the AI model expresses. Examples of structures that can be used as the model structure 320 include decision trees, support vector machines, regression analyses, Bayesian networks, Gaussian processes, genetic algorithms, and artificial neural networks (or, simply, neural networks). The model structure 320 can include a number of structure layers, a number of nodes (or neurons) at each structure layer, and activation functions of each node. Each node's activation function defines how a node converts data received to data output. The structure layers may include an input layer of nodes that receive input data, an output layer of nodes that produce output data. The model structure 320 may include one or more hidden layers of nodes between the input and output layers. The model structure 320 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 322 represent the relationships learned during training and can be used to make predictions and decisions based on input data. The model parameters 322 can weight and bias the nodes and connections of the model structure 320. For instance, when the model structure 320 is a neural network, the model parameters 322 can weight and bias the nodes in each layer of the neural networks, such that the weights determine the strength of the nodes and the biases determine the thresholds for the activation functions of each node. The model parameters 322, in conjunction with the activation functions of the nodes, determine how input data is transformed into desired outputs. The model parameters 322 can be determined and/or altered during training of the algorithm 316.

The model structure 320, parameters 322, and algorithm 316 formally comprise the design, properties, and implementation of an AI model 318. The model structure 320 defines the types of input data used, types of output data produced, and parameters 322 available that can be modified by the algorithm 316. The model parameters 322 are assigned values by the algorithm 317 that determine the characteristics and properties of a specific model state. For example, the algorithm 316 can improve model task performance by adjusting the values of parameters 322 that reduces prediction errors. The algorithm 316 is responsible for processing input data to be compatible with the model structure 320, executing the AI model 318 on available training data, evaluating performance of model output, and adjusting the parameters 322 to reduce model errors. Thus, the model structure 320, parameters 322, and algorithm 316 comprise co-dependent functionalities and are the core components of an AI model 318.

The loss function engine 324 can determine a loss function, which is a metric used to evaluate the AI model's performance during training. For instance, the loss function engine 324 can measure the difference between a predicted output of the AI model and the actual output of the AI model and is used to guide optimization of the AI model during training to minimize the loss function.

The optimizer 326 adjusts the model parameters 322 to minimize the loss function during training of the algorithm 316. In other words, the optimizer 326 uses the loss function generated by the loss function engine 324 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 326 used may be determined based on the type of model structure 320 and the size of data and the computing resources available in the environment layer 302.

The regularization engine 328 executes regularization operations. Regularization is a technique that prevents over- and under-fitting of the AI model. Overfitting occurs when the algorithm 316 is overly complex and too adapted to the training data, which can result in poor performance of the AI model. Underfitting occurs when the algorithm 316 is unable to recognize even basic patterns from the training data such that it cannot perform well on training data or on validation data. The optimizer 326 can apply one or more regularization techniques to fit the algorithm 316 to the training data properly, which helps constraint the resulting AI model and improves its ability for generalized application. Examples of regularization techniques include lasso (L1) regularization, ridge (L2) regularization, and elastic (L1 and L2 regularization).

The application layer 308 describes how the AI system 300 is used to solve problems or perform tasks.

Figure 3B:
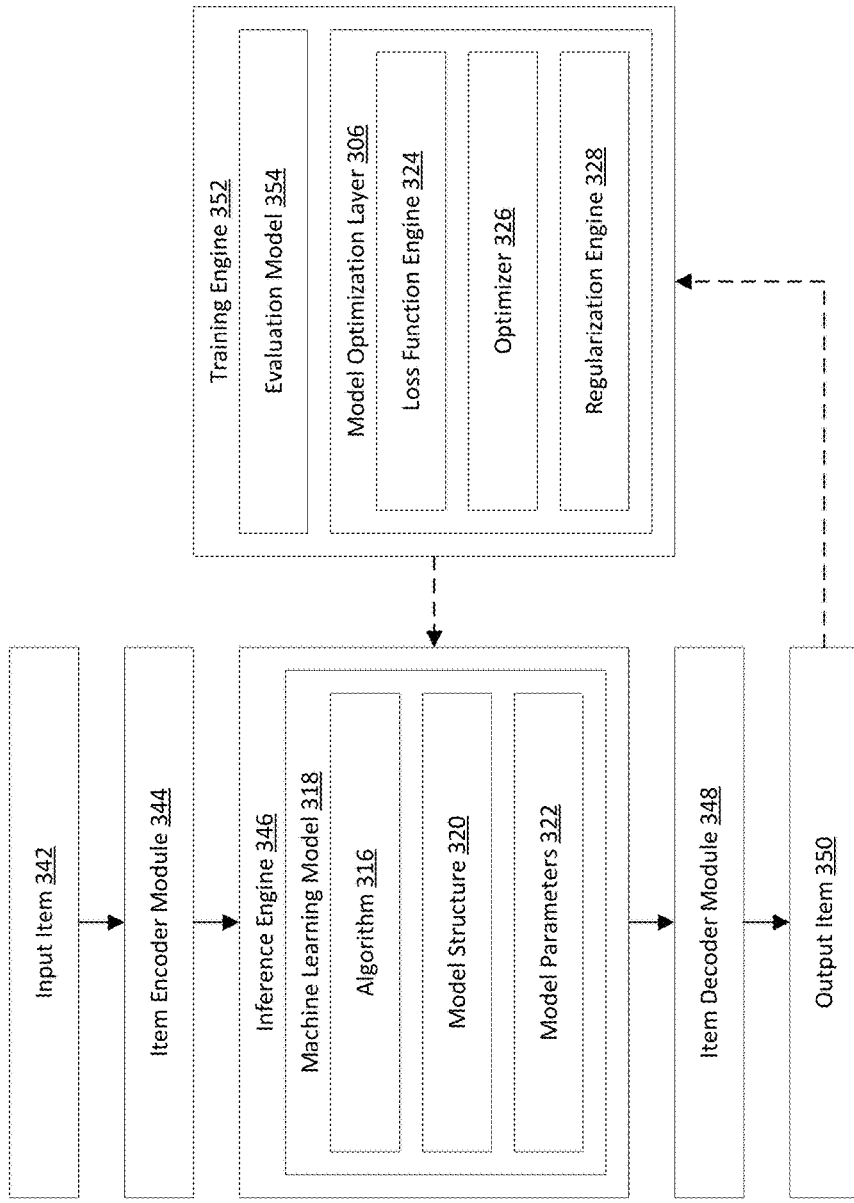
FIG. 3B illustrates an example model implementation platform 330 in accordance with some implementations of the present technology.

FIG. 3B illustrates an example model implementation platform 330 in accordance with some implementations of the present technology. According to various implementations, the model implementation platform 330 can include an inference engine 346 based on the machine learning model 318, algorithm 316, model structure 320, and parameters 322. In additional or alternative implementations, the model implementation platform 330 can include a training engine 352 based on a separate evaluation model 354, the model optimization layer 306, loss function engine 324, optimizer 326, and regularization engine 328. In some embodiments, the model implementation platform 330 can include both the inference engine 346 and the training engine 352 in the workflow to train the model 318. In alternative or additional embodiments, the model implementation platform 330 can include the inference engine 346 and without the training engine 352 in the workflow to make multiple model inferences without altering model parameters 322.

The model implementation platform 330 can include, for example, an auto-encoder used in unsupervised learning. Accordingly, the model implementation platform 330 can be configured to perform model inference on an input item 342 using the inference engine 346. For example, the model implementation platform 330 can supply the inference engine 346 with the input item 342 and generate an inference output item 350. In some embodiments, the model implementation platform 330 can supply the input item 342 to an item encoder module 344 to generate an encoded input item that is supplied to the inference engine 346 in lieu of the raw input item 342. In additional or alternative embodiments, the model implementation platform 330 can supply an immediate output item of the inference engine 346 to an item decoder module 348 to generate the output item 350. To clarify, in lieu of the immediate output item of the inference engine 346, the output item 350 can be generated as the decoded output of the item decoder module 348. In some embodiments, the model implementation platform 330 can include the item encoder module 344, item decoder module 348, and/or any combination thereof.

In some embodiments, the input item 342 provided to the model implementation platform 330 can include a character sequence (e.g., a text string of characters), an image (e.g., a multi-dimensional array comprising of pixel color values), and audio signal (e.g., a spectrogram of an audio file), a set of vectors, general data objects (e.g., a class instance comprising internal attributes and/or properties), and/or any combination thereof. In other embodiments, the output item 350 generated from the model implementation platform 330 can include an image and/or a set of images. In additional or alternative embodiments, the output item 350 can also include, on top of the image and/or the set of images, a character sequence, an audio signal, a set of vectors, general data objects, and/or any combination thereof.

In some embodiments, the item encoder module 344 and item decoder module 348 of the model implementation platform 330 can be a discrete set of algorithmic instructions to convert a source data item to a converted data item. For example, if the input item 342 was a multi-dimensional array of size m by n, the item encoder module 344 can be configured with a discrete set of algorithmic instructions to flatten the shape of the input item 342 array into a 1 by m×n shape array. In additional or alternative embodiments, the item encoder module 344 and item decoder module 348 can be individual neural network model layers separate from the model 318. In other embodiments, the item encoder module 344 and item decoder module 348 can be configured to ensure that the properties (e.g., array shape) of the converted data item adheres to a specified set of properties. For example, the item encoder module 344 can be configured to ensure that the input item 342 is converted into an acceptable input pattern for the model 318.

The model implementation platform 330 can be configured to perform model training on the output item 350 using the training engine 352. For example, the model implementation platform 330 can supply the training engine 352 with the output item 350 and generate a loss value using the loss function engine 324. The model implementation platform 330 can use the loss value generated from the loss function engine 324 to change and/or modify the model parameters 322 of the model used by the inference engine 346. In additional or alternative embodiments, the training engine 352 can include an evaluation model 354 that is separate from the model 318. In some embodiments, the evaluation model 354 can generate a loss compatible output item from the output item 350 that can be used to calculate the loss value using the loss function engine 324.

Computer System

Figure 4:
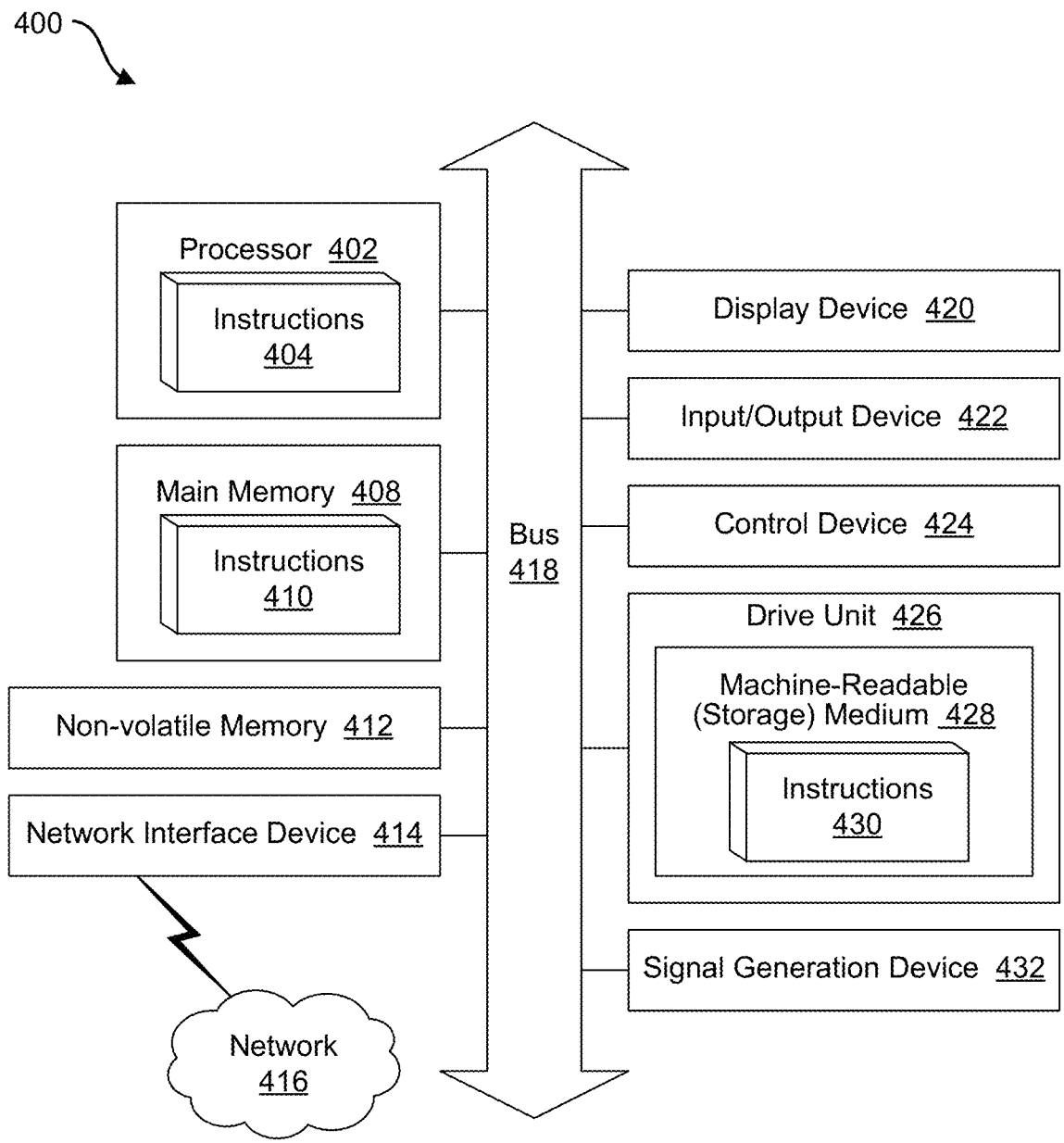
FIG. 4 is a block diagram that illustrates an example of a computer system 400 in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a machine-readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computer system 400 can be an embedded computer system, a system-on-chip (SOC), a single-board computer system (SBC), or a distributed system such as a mesh of computer systems, or it can include one or more cloud components in one or more networks. Where appropriate, one or more computer systems 400 can perform operations in real time, in near real time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Figure 5:
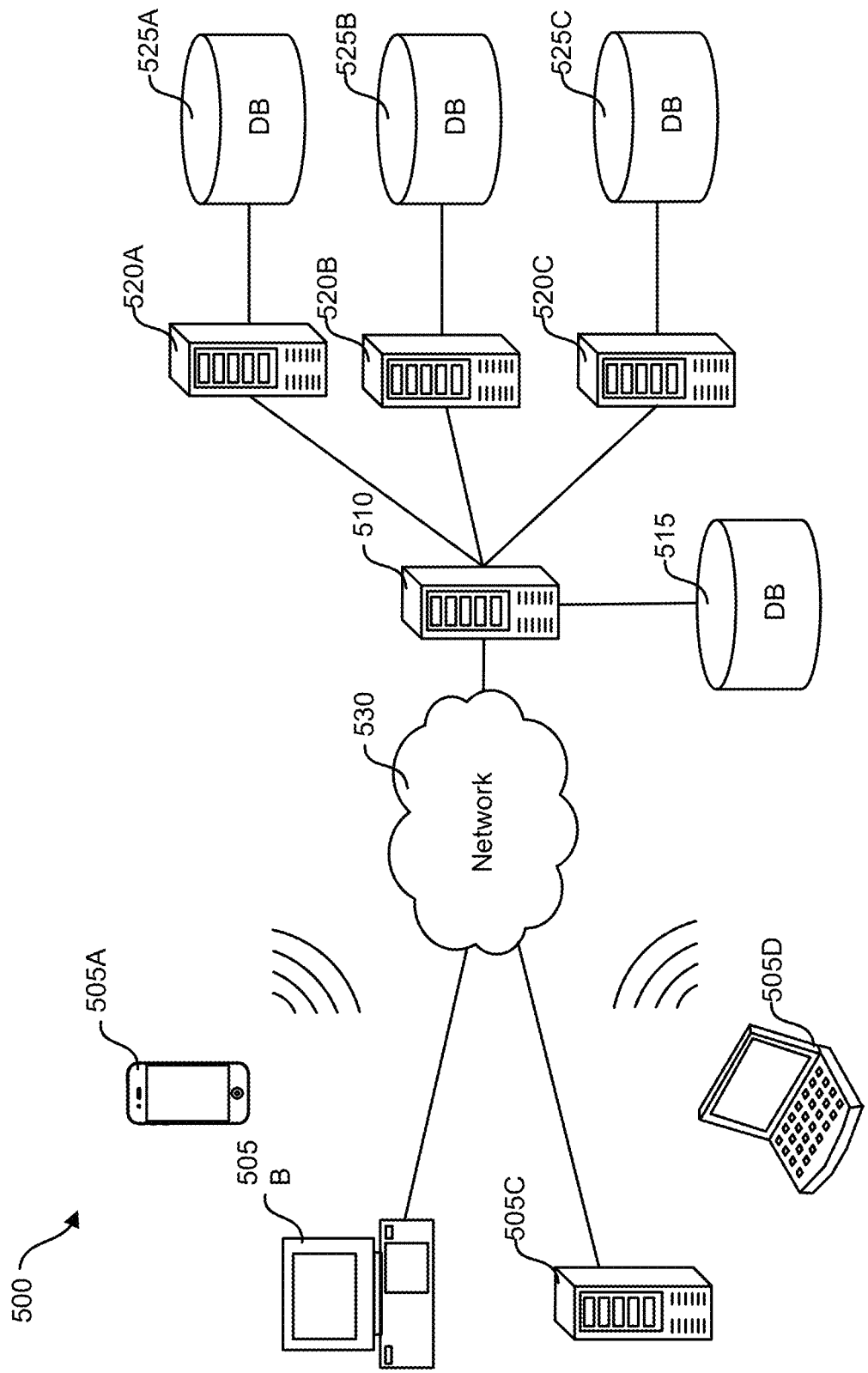
FIG. 5 is a system diagram illustrating an example of a computing environment in which the disclosed system operates in some implementations.

FIG. 5 is a system diagram illustrating an example of a computing environment in which the disclosed system operates in some implementations. In some implementations, environment 500 includes one or more user devices 505A-D, examples of which can access the virtual environment. The user devices 505 operate in a networked environment using logical connections through network 530 to one or more remote computers, such as a server computing device.

In some implementations, server 510 is an edge server which receives user requests and coordinates fulfillment of those requests through other servers, such as servers 520A-C. In some implementations, server computing devices associated with servers comprise computing systems and is displayed logically as a single server, such as the network server 130 of FIG. 1. The server computing devices can each be a distributed computing environment encompassing multiple computing devices located at the same or at geographically disparate physical locations. In some implementations, each server of the servers 520A-C corresponds to a group of servers.

User devices 505A-D and servers 510 and 520A-C can each act as a server or user to other server or user devices. In some implementations, servers (510, 520A-C) connect to a corresponding database (515, 525A-C). As discussed above, each server 520 can correspond to a group of servers, and each of these servers can share a database or can have its own database. Databases 515 and 525 warehouse information such as a virtual object store, a prompt store, and/or a prompt response store. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. In some implementations, network 530 is the Internet or some other public or private network. The user devices 505 are connected to network 530 through a network interface, such as by wired or wireless communication. While the connections between the server 510 and the servers 520A-C are shown as separate connections, these connections can be any kind of local, wide area, wired, or wireless network, including network 530 or a separate public or private network.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Further Aspects, Techniques and Use Cases

Figure 6:
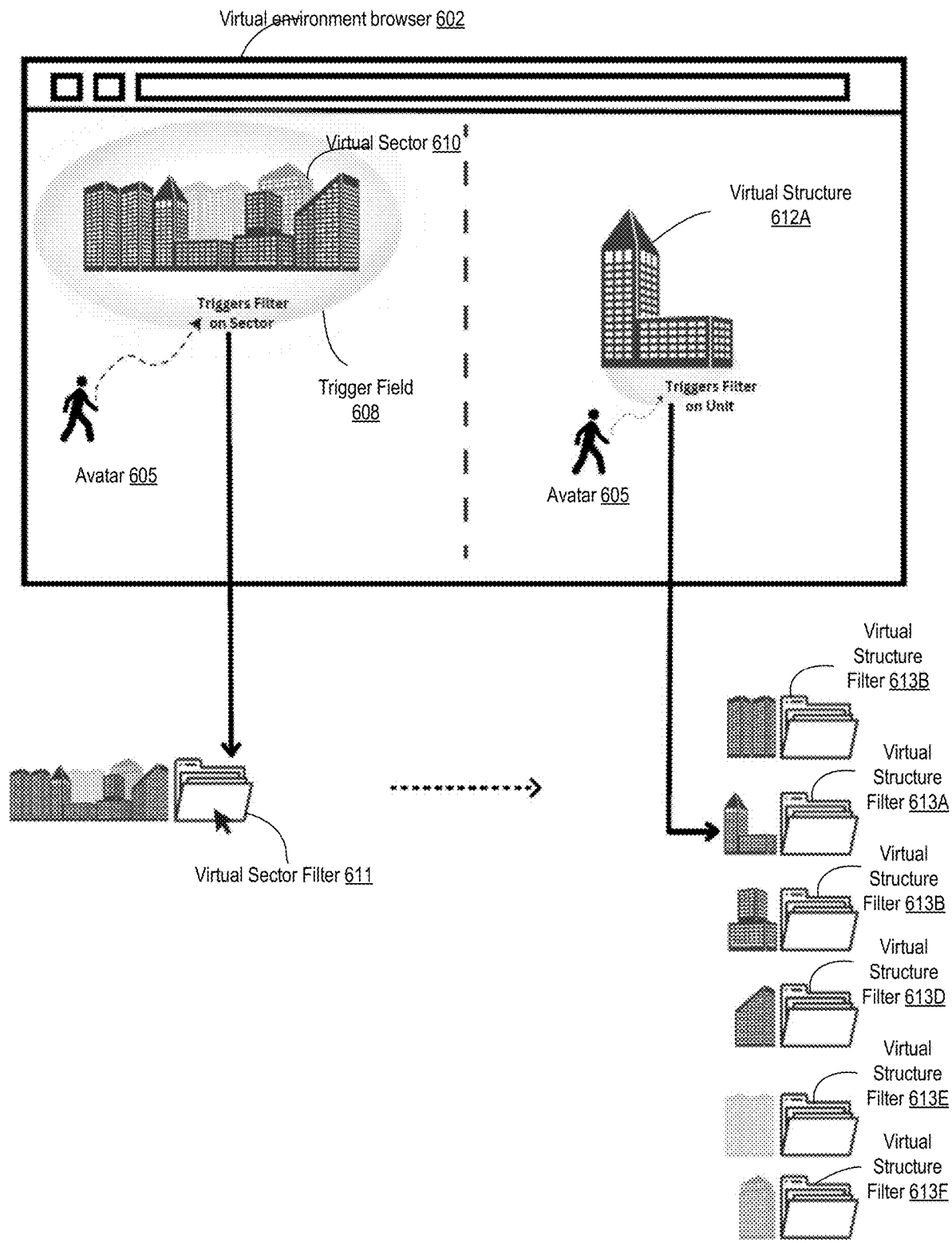
FIG. 6 illustrates triggering of virtual sector filters and virtual structure filters based on detecting a position of an avatar within a virtual environment by a system for providing VR content for VR experience, according to some implementations.

FIG. 6 illustrates triggering of virtual sector filters and virtual structure filters based on detecting a position of an avatar 605 within a virtual environment by a system for providing VR content for VR experience, according to some implementations. As shown in FIG. 6, the virtual environment is displayed in a virtual environment browser 602 of a web browser accessed by a computer. In some embodiments, the virtual environment is displayed in other platforms, such as a display screen inside a wearable device coupled with hand tracking controllers configured to enable a user of the wearable device to move the avatar 605 and/or interact with features within the virtual environment through hand gestures and motions.

The virtual environment that is generated and rendered can include one or more virtual sectors 610 each having an identifiable theme such that one or more virtual structures, such as virtual structure 612A within the same virtual sector share common features. For example, each of the virtual sectors in the virtual environment can represent a data item stored in a job dataset, an educational institution dataset, a scholarship dataset, a survey dataset, and a skill dataset. In a virtual environment configured to display information of the job dataset, each virtual sector can represent groups of professions with commonalities.

The user is enabled to position the avatar 605 within the virtual environment to express the user's intent. In some implementations, whether the avatar is within a predetermined distance or within a trigger field 608 of the particular virtual sector is determined. Positioning the avatar 605 within the trigger field 608 of the virtual sector 610 can indicate the user's intent to obtain information associated with the virtual sector 610. In some implementations, the system is configured to receive field of view information of a visual output device to determine the user's intent. The virtual sector 610 within the field of view of the user using the visual output device can indicate the user's intent to obtain information associated with the virtual sector 610.

Upon determining the user's intent to obtain more information associated with the virtual sector 610, the system generates a sector data layer using one or more virtual sector filters 611. Each filter in the system includes an executable logic to create, modify, and/or combine objects of different levels as they appear in the VR environment. The sector data layer can include data items related to at least one preconfigured dataset. After the sector data layer is generated, the system can associate a set of items in the sector data layer to the virtual sector and configure a displayed attribute of the virtual sector based on one or more items in the sector data layer. In some implementations, the dataset is communicatively coupled to an external database or a database within the system such that the dataset is updated periodically to reflect information stored in the external database or the database within the system.

For example, the user wanting to learn more about available professions associated with healthcare can position the avatar 605 within the trigger field 608 of the virtual sector 610 representing healthcare jobs. Upon detecting the position of the avatar 605, the system employs virtual sector filters 611 to create objects, such as the virtual structure 612A within the virtual sector 610, wherein each virtual structure is associated with unique professions available in the healthcare industry. For ease of access, the virtual sector 610 can be represented as a hub of multiple virtual buildings, and each virtual structure within the virtual sector 610 can be represented as a building with multiple floors and/or rooms.

The virtual sector 610 can include multiple virtual structures each representing a subset of data items. Upon determining the user's intent to obtain information associated with a particular virtual structure, such as the virtual structure 612A, the system can generate a subset of data using the set of items in the sector data layer corresponding to the virtual sector 610 and employing a virtual structure filter 613A to generate, modify, and/or combine the set of items corresponding to the virtual structure 612A. For example, the virtual sector 610 which represents healthcare jobs can include a virtual structure 612A representing nursing professionals, a virtual structure 612B representing surgical professionals, a virtual structure 612C representing pharmacy professionals, etc. The system can be configured to detect the position of the avatar 605 and track interactions of the avatar 605 with the one or more virtual structures.

Figure 7:
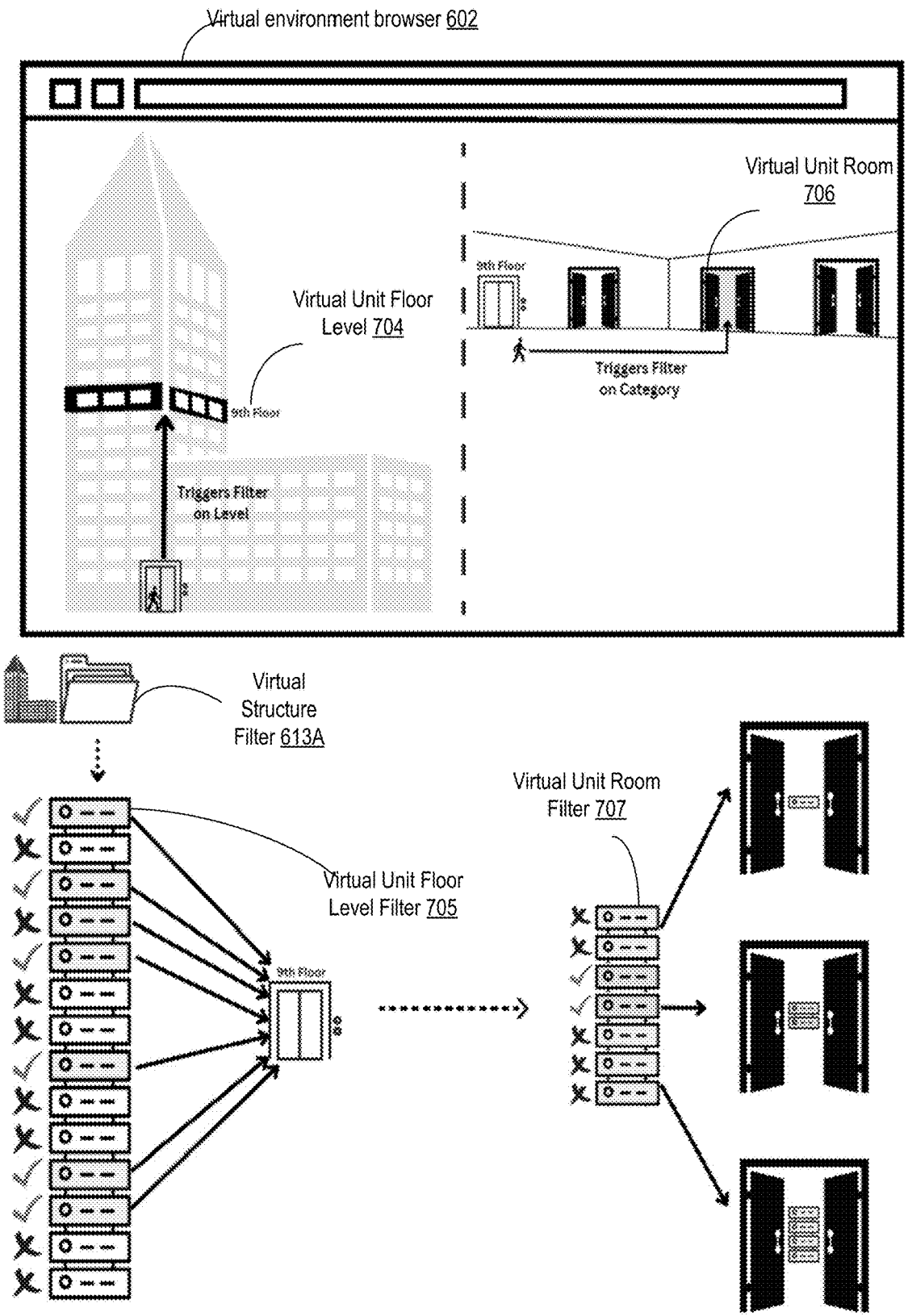
FIG. 7 illustrates triggering of virtual structure filters, virtual unit floor level filters, and virtual unit room filters based on detecting a position of an avatar within a virtual structure by a system for providing VR content for VR experience, according to some implementations.

FIG. 7 illustrates triggering of virtual structure filters, virtual unit floor level filters, and virtual unit room filters based on detecting a position of an avatar 605 within a virtual structure by a system for providing VR content for VR experience, according to some implementations. Referring to the example above regarding the user's interactions with the virtual structure 612A, the virtual structure filter 613A can include filters of different levels. Each of the multiple filters includes an executable logic to create, modify, and/or combine objects of different levels as they appear in the VR environment.

In some implementations, within each of the virtual structure is a navigation control that enables the avatar 605 to navigate around different levels of data displayed in the virtual structure. The virtual structure as illustrated in FIG. 7 includes two different levels of data. Different embodiments can include additional, fewer, or different levels of data. Each level in the virtual structure can represent a subset of data corresponding to a particular one of the first level and the second level. As illustrated in FIG. 7, the first level, which is created and modified by the system using a virtual unit floor level filter 705, creates subsets of the data, each of which is configured to display an attribute of the virtual structure based on each subset of the data. The subsets of data are represented as unit floors within the virtual structure.

For example, in a virtual structure representing surgical professionals, each virtual unit floor level can represent different surgical specialties, with the first floor representing general surgery, second floor representing colon and rectal surgery, third floor representing pediatric surgery, etc. Interactions between the avatar 605 and each virtual unit floor and/or the navigation control are tracked by the system, and relevant virtual unit floor level filters are triggered upon detecting that the avatar 605 has interacted with a particular virtual unit floor to display information associated with the particular virtual unit floor.

The second level, which is created and modified by the system using a virtual unit room filter 707, creates subsets of data within each floor level which are represented as virtual unit rooms, such as a virtual unit room 706 (or another navigation option). For example, referring to the above example regarding the virtual structure representing surgical professionals, the third floor representing pediatric surgery can include a first room representing pediatric surgery related to orthopedic problems, a second room representing pediatric surgery related to trauma, a third room representing pediatric surgery related to cancer, etc. Interactions between the avatar 605 and each virtual unit room and/or the navigation control are tracked by the system, and relevant virtual unit room filters are triggered upon detecting that the avatar 605 has interacted with a particular virtual unit room to display information associated with the particular virtual unit room.

Figure 8:
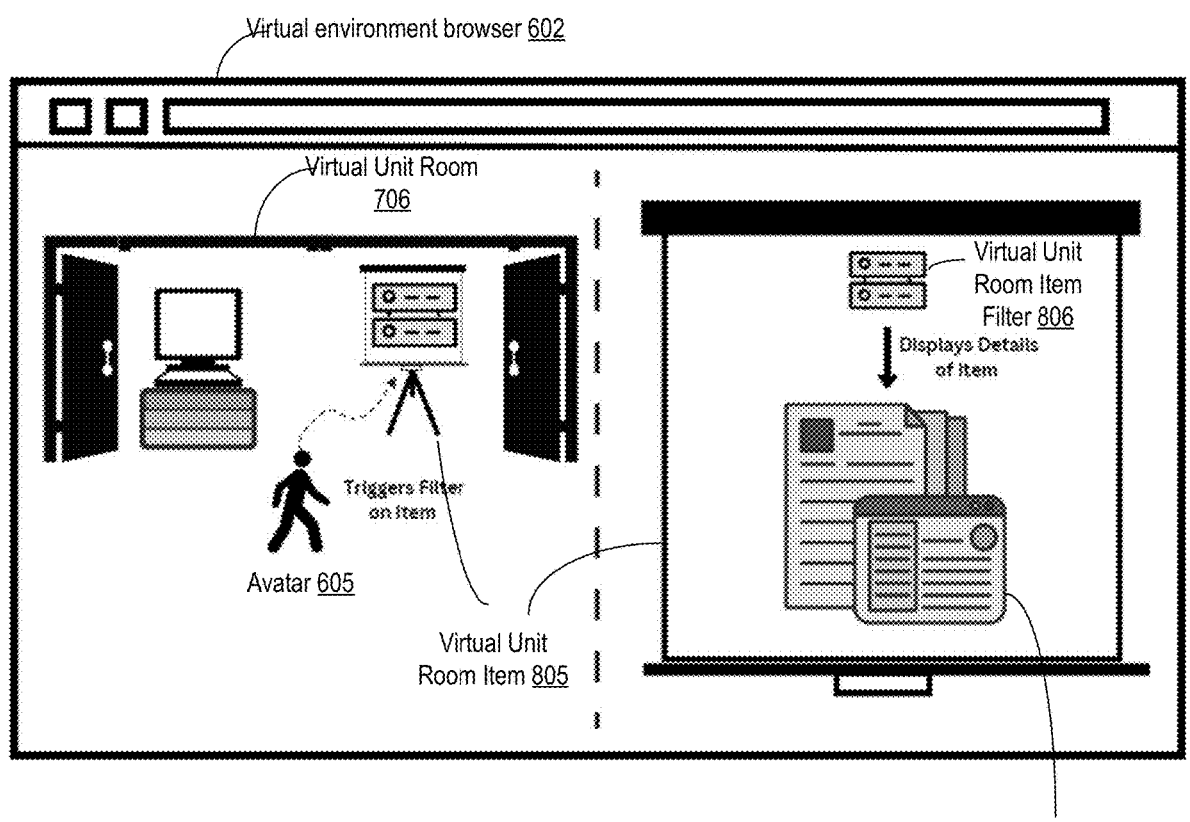
FIG. 8 illustrates an example display of information associated with the virtual unit room, according to some implementations.

FIG. 8 illustrates an example display of information associated with the virtual unit room 706, according to some implementations. The virtual unit room 706 can include one or more virtual unit room items, such as a virtual unit room item 805 which is configured to display details of the unit room item through an information display 808. The system can apply a virtual unit room item filter 806 to create and modify display of virtual unit room items based on factors such as history of interactions between the avatar 605 and the virtual environment. In some implementations, the information display 808 can include a hyperlink that is generated based on the history of interactions. A user interaction with the hyperlink, such as clicking the hyperlink or eyepoint detection, can prompt the system to present a resource identified by the hyperlink. The resource can be an external web page and/or a downloadable application or document.

Figure 9A:
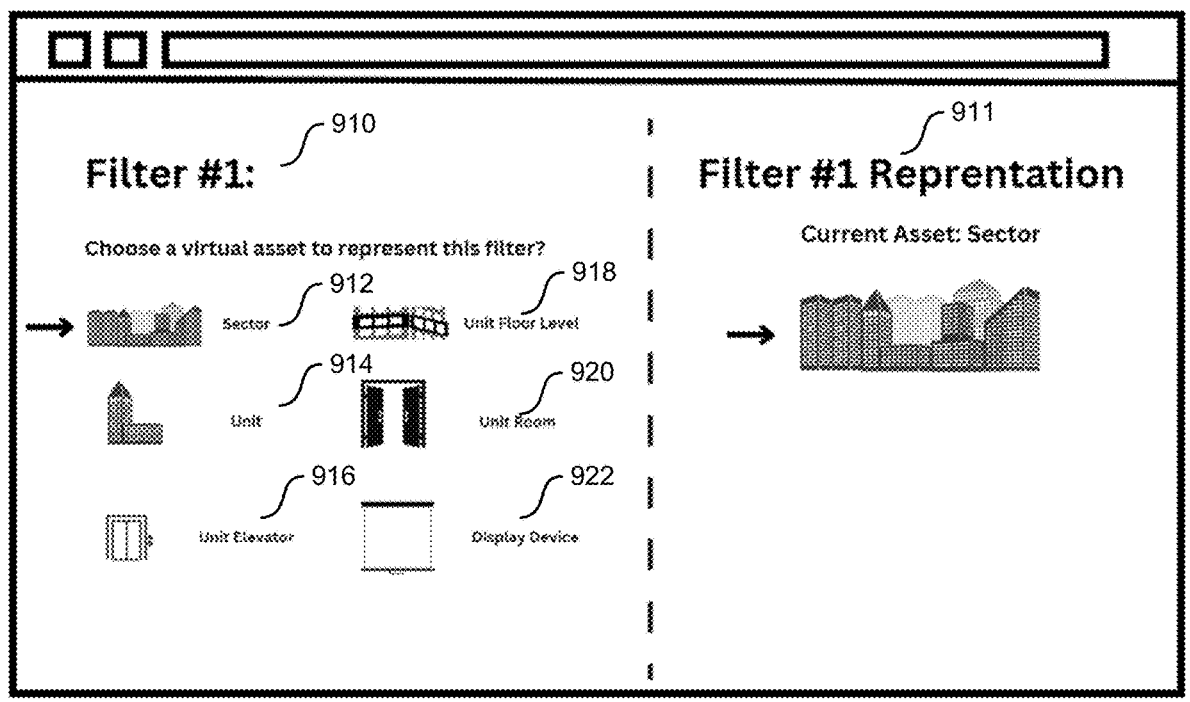
FIG. 9A illustrates multiple filters of different levels of virtual assets in the virtual environment, according to some implementations.

FIGS. 9A-F illustrate example steps taken to apply filters associated with layers of information to create, modify, and/or combine information displayed to a user of the virtual environment, according to some implementations. FIG. 9A illustrates multiple filters of different levels of virtual assets in the virtual environment, such as sector 912, unit 914, unit elevator 916, unit floor level 918, unit room 920, and display device 922. The levels of virtual assets in the virtual environment are not limited to sectors and virtual buildings as illustrated in FIG. 9A. For example, the different levels of virtual assets can include other structures or objects, such as building of different shape, or objects such as a spaceship. The filters that are generated and modified by the system are used to create and modify the virtual environment as the user navigates through the virtual environment. Each of the multiple filters includes an executable logic to create, modify, and/or combine objects of different levels as they appear in the virtual environment. As illustrated in FIG. 9A, the asset selected for the first filter 910 is a sector, indicating the first filter is configured to create, modify, and/or combine data and objects within the sector. In some implementations, the administrator is enabled to confirm the virtual asset selected for filter application via a representation 911.

Figure 9B:
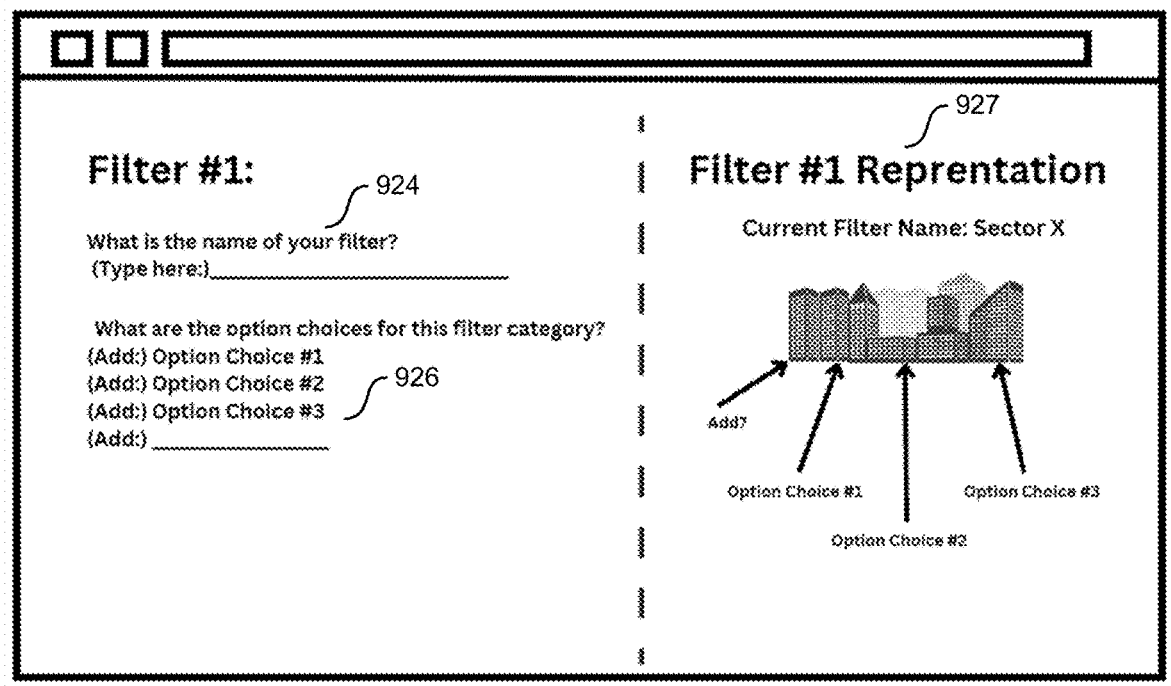
FIG. 9B illustrates defining of the first filter in the virtual environment, according to some implementations.

FIG. 9B illustrates defining of the first filter in the virtual environment. In some implementations, an administrative user is enabled to assign a label 924 to the first filter for ease of recognition. The administrative user is further enabled to create, modify, and/or delete data and items to be displayed upon selection of the sector via an interface 926. For example, for a sector representing engineering schools, the administrative user is able to add multiple option choices. Each option choice can represent an engineering school, such as Stanford University, California Institute of Technology, etc. As illustrated in FIGS. 9A-B, the sector 912 is represented as a collection of virtual buildings, wherein each virtual building represents an option choice within the sector 912. The administrator user is enabled to configure a displayed attribute of the sector 912 by creating, modifying, and/or deleting option choices. In some implementations, the administrator is enabled to visualize, via a representation 927, the label of the current filter and option choices as created/modified.

Figure 9C:
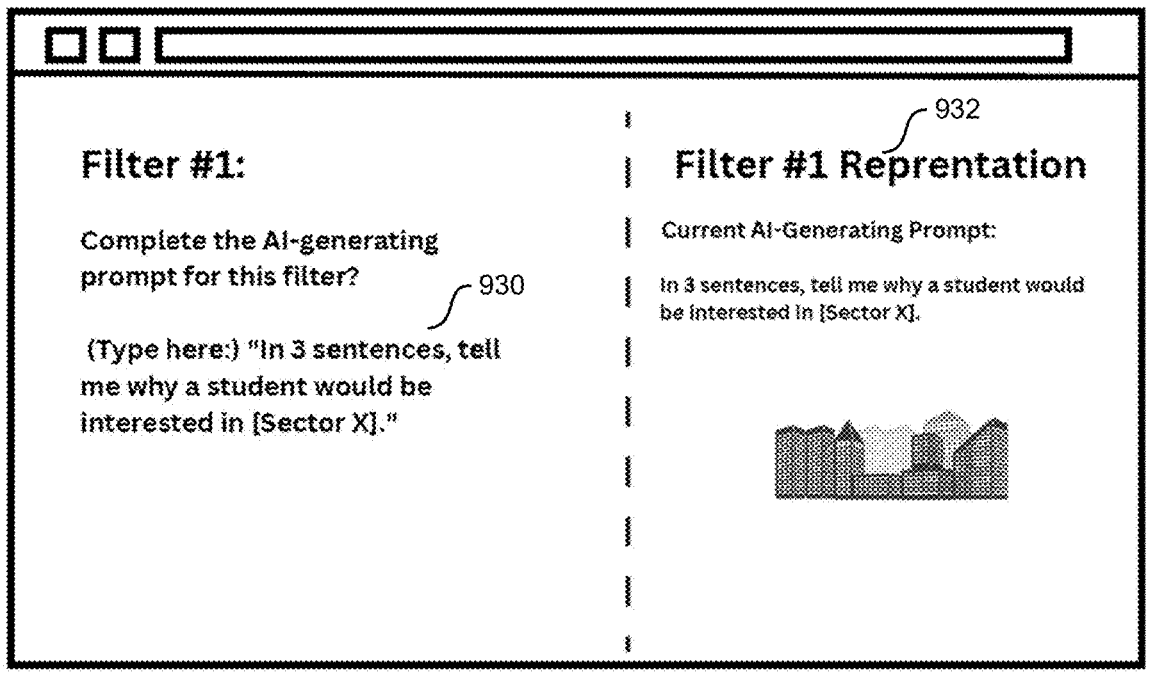
FIG. 9C illustrates generating a prompt for use by a generative AI executable to be used in conjunction with the display of a sector, according to some implementations.

FIG. 9C illustrates generating a prompt (and/or prompt stub, prompt template, or similar customizable prompt definition) for use by a generative AI executable to be used in conjunction with the display of the sector 912. The prompt, such as an example prompt 930 as illustrated in FIG. 9C, may be selected from a prompt store which can be structured to store stubs of prompt response options associatively linked to items in the prompt store. Alternatively, the prompt may be generated by the administrative user. The generative AI executable is parametrized using the generated prompt, and the system can associate the generative AI executable to the applicable sector. Upon detecting that the sector is within a field of view of a user interacting with the virtual environment and/or upon detecting that the avatar of the user is within a predetermined distance of the sector, the generative AI executable can run the prompt to generate a response to the prompt. A representation 932 displaying the prompt run by the generative AI executable can be displayed upon such detection. Additionally, the response to the prompt can be presented to the user as textual, visual, and/or audio output.

Figure 9D:
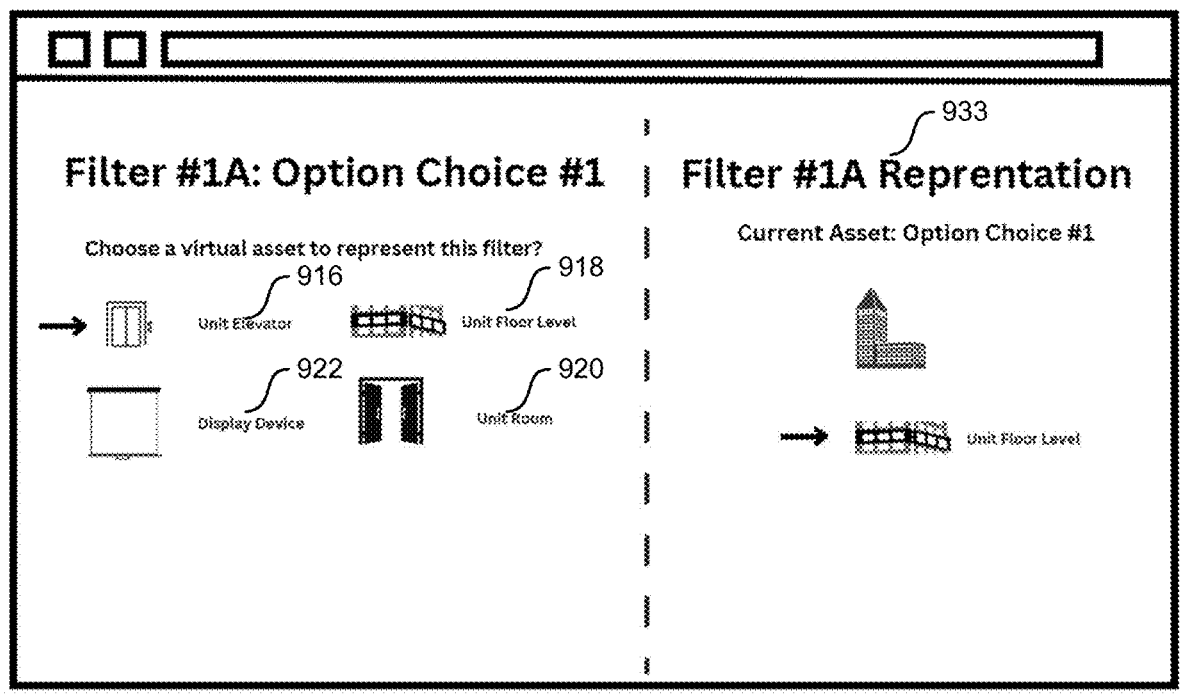
FIG. 9D illustrates defining multiple filters of different levels to create and/or modify virtual representations of subsets of data, according to some implementations.
Figure 9E:
FIG. 9E illustrates modifying multiple filters of different levels, according to some implementations.

FIGS. 9D-E illustrate defining multiple filters of different levels to create and/or modify virtual representations of subsets of data. As illustrated in FIG. 9D, the system or the administrative user can create filters for virtual assets of different levels, such as option choices of the sector represented as virtual buildings. The filters can be created for subsets of the virtual buildings, such as unit floor level 918, unit room 920, unit elevator 916, and/or display device 922 within unit rooms. In some implementations, a representation 933 indicating the level of virtual asset selected to be displayed to the user of the virtual environment is presented to the administrative user. As illustrated in FIG. 9E, the administrative user is enabled to assign a label 934 to the filters for virtual assets of different levels for ease of recognition. The administrative user is further enabled to create, modify, and/or delete, via an interface 936, data and items to be displayed upon selection of the virtual assets of different levels, such as the unit floor level 918. A representation 938 including available elevator choices for unit floor level selection can be displayed to the user of the virtual environment. For example, for a sector representing engineering schools and a virtual building representing Stanford University, the administrative user is able to add multiple elevator choices each representing a unit floor level within the virtual building. Each elevator choice can represent engineering disciplines available to students attending Stanford University.

Figure 9F:
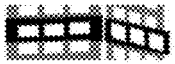
FIG. 9F illustrates generating a prompt for use by a generative AI executable to be used in conjunction with the display of virtual assets, according to some implementations.

FIG. 9F illustrates generating a prompt (and/or prompt stub, prompt template, or similar customizable prompt definition) for use by a generative AI executable to be used in conjunction with the display of the elevator choice, or the unit floor level within the virtual building. The prompt, such as an example prompt 940 as illustrated in FIG. 9F, may be selected from a prompt store which can be structured to store stubs of prompt response options associatively linked to items in the prompt store. Alternatively, the prompt may be generated by the administrative user. The generative AI executable is parametrized using the generated prompt, and the system can associate the generative AI executable to the applicable unit floor level. Upon detecting that the unit floor level is within a field of view of a user interacting with the virtual environment and/or upon detecting that the avatar of the user is within a predetermined distance of the unit floor level, the generative AI executable can run the prompt to generate a response to the prompt. A representation 942 displaying the prompt run by the generative AI executable can be displayed upon such detection. The response can be presented to the user as textual, visual, and/or audio output.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense-that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A method for generating representations of contextually searchable experiences in a virtual environment by automatically interpreting avatar activity, the method comprising:

generating and rendering, at a computing device, the virtual environment comprising a sector having one or more virtual structures, wherein a particular virtual structure in the one or more virtual structures comprises a first level, a second level, and a navigation control structured to position an avatar on the first level or the second level;

detecting a first position of the avatar within the virtual environment;

in response to (1) determining, using the first position of the avatar, that the avatar is within a predetermined distance of the sector and (2) detecting that the sector is within a field of view for a visual output device connected to the computing device, performing operations comprising:
generating a sector data layer,
wherein the sector data layer comprises data items related to at least one of a job dataset, an educational institution dataset, a scholarship dataset, a survey dataset, or a skill dataset;
binding a set of items in the sector data layer to the sector; and
configuring a first displayed attribute of the sector based on at least one first item from the set of items;
detecting a second position of the avatar; and
in response to (3) determining, using the second position of the avatar, that the avatar is positioned within the particular virtual structure of the sector, and (4) detecting a first interaction of the avatar with the navigation control, performing operations comprising:
determining, based on the first interaction, whether the avatar is positioned at the first level or the second level;
generating a subset of data using the set of items in the sector data layer, the subset of data corresponding to a particular one of the first level and the second level; and
configuring a second displayed attribute of the particular virtual structure based on the subset of data.

2. The method of claim 1, wherein the subset of data is generated according to at least one of a filter rank or a target filter ratio included in the sector data layer.

3. The method of claim 2, further comprising, based on at least one detected second interaction of the avatar with the navigation control, performing operations comprising:
determining a next displayable attribute of the particular virtual structure prior to the next displayable attribute appearing in the field of view;
dynamically refreshing the subset of data;
configuring the next displayable attribute based on the subset of data; and
causing the computing device to display the next displayable attribute.

4. The method of claim 3, wherein the subset of data is stored in a directory linked to the particular virtual structure, and wherein dynamically refreshing the subset of data based on the filter rank comprises populating a subdirectory with data items selected from the subset of data based on the filter rank.

5. The method of claim 3, wherein the subset of data is dynamically refreshed based on the filter rank.

6. The method of claim 1, wherein the second displayed attribute comprises a plurality of navigation options.

7. The method of claim 6, wherein the plurality of navigation options are discrete values.

8. The method of claim 6, wherein the plurality of navigation options are included in a range.

9. The method of claim 1, wherein generating the sector data layer comprises:
generating an inference regarding a particular user account represented by the avatar; and
based on the inference, automatically generating a query for the data items.

10. The method of claim 9, wherein generating the inference further comprises:
determining an additional profile information associated with the particular user account,
wherein the generated inference is based on the additional profile information, the additional profile information being at least one of an age, an academic record, a survey result, a career interest, geographical preference, a product interest, and an activity history.

11. The method of claim 9, wherein the subset of data is generated by merging first data related to a particular first category of interest and second data relating to a particular second category of interest, and wherein each of the particular first category of interest and the particular second category of interest are determined based on the inference regarding the particular user account.

12. The method of claim 1, further comprising:
in response to detecting a user interaction with the second displayed attribute, performing operations comprising:
dynamically generating a hyperlink comprising an item determined based on the second displayed attribute; and
in response to detecting a user interaction with the hyperlink, causing the virtual environment to present a resource identified by the hyperlink.

13. The method of claim 12, wherein the resource is a downloadable application and a web page.

14. The method of claim 1, wherein the one or more virtual structures is one of a building and a spaceship.

15. The method of claim 1, wherein configuring the first displayed attribute of the sector further comprises:
automatically generating a first prompt for use by a first generative artificial intelligence (AI) executable that comprises a first trained AI model, wherein the first prompt is selected from a prompt store;
parametrizing the first generative AI executable using the first prompt;
binding the first generative AI executable to the sector;
upon detecting that the sector is within the field of view for the visual output device, executing the first generative AI executable, wherein the first generative AI executable runs the first trained AI model using the first prompt to generate a description of the sector based on the first displayed attribute; and
presenting, as textual and/or visual and/or audio output, the description of the sector.

16. The method of claim 15, wherein configuring the second displayed attribute of the particular virtual structure further comprises:
generating a second prompt for use by a second generative artificial intelligence (AI) executable that comprises a second trained AI model;
parametrizing the second generative AI executable using the second prompt;
binding the second generative AI executable to the particular virtual structure;
upon detecting that the particular virtual structure is within the field of view for the visual output device, executing the second generative AI executable, wherein the second generative AI executable runs the second trained AI model using the second prompt to generate a description of the particular virtual structure based on the second displayed attribute; and
presenting, as textual and/or visual output and/or audio output, the description of the particular virtual structure.

17. The method of claim 16, wherein at least one of the first prompt and the second prompt is selected from the prompt store.

18. A system for generating representations of contextually searchable experiences in a virtual environment by automatically interpreting avatar activity, the system comprising:

at least one hardware processor; and at least one non-transitory memory storing instructions, which, when executed by the at least one hardware processor, cause the system to:

generate and render, at a computing device, the virtual environment comprising a sector having one or more virtual structures, wherein a particular virtual structure in the one or more virtual structures comprises a first level, a second level, and a navigation control structured to position an avatar on the first level or the second level;

detect a first position of the avatar within the virtual environment;

in response to (1) determining, using the first position of the avatar, that the avatar is within a predetermined distance of the sector and (2) detecting that the sector is within a field of view for a visual output device connected to the computing device, perform operations comprising:

generate a sector data layer, wherein the sector data layer comprises data items retrieved from a stored dataset;

bind a set of items in the sector data layer to the sector; and configure a first displayed attribute of the sector based on at least one first item from the set of items;

detect a second position of the avatar; and in response to (3) determining, using the second position of the avatar, that the avatar is positioned within the particular virtual structure of the sector, and (4) detecting a first interaction of the avatar with the navigation control, perform operations comprising:

determine, based on the first interaction, whether the avatar is positioned at the first level or the second level;

generate a subset of data using the set of items in the sector data layer, the subset of data corresponding to a particular one of the first level and the second level; and configure a second displayed attribute of the particular virtual structure based on the subset of data.

19. The system of claim 18, wherein configuring the first displayed attribute of the sector further comprises:

automatically generating a prompt for use by a generative artificial intelligence (AI) executable, wherein the prompt is selected from a prompt store;

parametrizing the generative AI executable using the prompt;

binding the generative AI executable to the sector;

upon detecting that the sector is within the field of view for the visual output device, executing the generative AI executable, wherein the generative AI executable runs the prompt to generate a description of the sector based on the first displayed attribute; and presenting, as textual and/or visual and/or audio output, the description of the sector.

20. A non-transitory, computer-readable storage medium storing executable instructions, the instructions, when executed by one or more processors, cause the one or more processors to:

generate and render, at a computing device, a virtual environment comprising a sector having one or more virtual structures, wherein a particular virtual structure in the one or more virtual structures comprises a first level, a second level, and a navigation control structured to position an avatar on the first level or the second level;

detect a first position of the avatar within the virtual environment;

in response to (1) determining, using the first position of the avatar, that the avatar is within a predetermined distance of the sector, perform operations comprising:

generate a sector data layer, wherein the sector data layer comprises data items retrieved from a stored dataset;

bind a set of items in the sector data layer to the sector; and configure a first displayed attribute of the sector based on at least one first item from the set of items;

detect a second position of the avatar; and in response to (3) determining, using the second position of the avatar, that the avatar is positioned within the particular virtual structure of the sector, and (4) detecting a first interaction of the avatar with the navigation control, perform operations comprising:

determine, based on the first interaction, whether the avatar is positioned at the first level or the second level;

generate a subset of data using the set of items in the sector data layer, the subset of data corresponding to a particular one of the first level and the second level; and configure a second displayed attribute of the particular virtual structure based on the subset of data.

* * * * *